(12) United States Patent
Nagai et al.

(10) Patent No.: US 12,340,583 B2
(45) Date of Patent: Jun. 24, 2025

(54) RECORDING APPARATUS, RECORDING METHOD, AND NON-TRANSITORY COMPUTER READABLE MEDIUM

(71) Applicant: JVCKENWOOD Corporation, Yokohama (JP)

(72) Inventors: Katsuyuki Nagai, Yokohama (JP); Takayuki Arase, Yokohama (JP); Akinori Sugata, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 31 days.

(21) Appl. No.: 17/846,857

(22) Filed: Jun. 22, 2022

(65) Prior Publication Data
US 2022/0392223 A1    Dec. 8, 2022

Related U.S. Application Data

(63) Continuation of application No. PCT/JP2020/028991, filed on Jul. 29, 2020.

(30) Foreign Application Priority Data

Dec. 23, 2019  (JP) ................. 2019-231563
Dec. 23, 2019  (JP) ................. 2019-231564

(51) Int. Cl.
*G06V 20/40*    (2022.01)
*G06V 20/56*    (2022.01)
(Continued)

(52) U.S. Cl.
CPC ............. *G06V 20/44* (2022.01); *G06V 20/56* (2022.01); *H04N 5/772* (2013.01)

(58) Field of Classification Search
None
See application file for complete search history.

(56) References Cited

U.S. PATENT DOCUMENTS

| | | | | |
|---|---|---|---|---|
| 6,092,853 A | * | 7/2000 | Hubbard | B60N 2/4221 |
| | | | | 296/68.1 |
| 2014/0056573 A1 | * | 2/2014 | Nakaya | H04N 21/47214 |
| | | | | 386/248 |

(Continued)

FOREIGN PATENT DOCUMENTS

| | | |
|---|---|---|
| JP | 2009157554 A | 7/2009 |
| JP | 2018082390 A | 5/2018 |

(Continued)

OTHER PUBLICATIONS

English translation of JP 2018148325 A.*

*Primary Examiner* — Hung Q Dang
(74) *Attorney, Agent, or Firm* — PROCOPIO, CORY, HARGREAVES & SAVITCH LLP

(57) ABSTRACT

A recording apparatus includes an imaging data acquisition unit, a movement information acquisition unit, an inter-vehicle detection unit and a recording control unit. The imaging data acquisition unit acquires imaging data and voice data. The movement information acquisition unit acquires movement information including a moving speed of the vehicle. The inter-vehicle detection unit detects an inter-vehicle distance between the vehicle and the other vehicle. The recording control unit determines that a voice recording condition is established when the moving speed of the vehicle is equal to or higher than a preset speed and the inter-vehicle distance is less than a preset distance, and causes the recording unit to record a first imaging data including the video data and the voice data when the voice recording condition is established or a second imaging data including the video data but not the voice data when the condition is not established.

4 Claims, 23 Drawing Sheets

(51) Int. Cl.
*G06V 20/58* (2022.01)
*G07C 5/00* (2006.01)
*H04N 5/77* (2006.01)
*H04N 9/82* (2006.01)
*H04N 23/698* (2023.01)

(56) References Cited

U.S. PATENT DOCUMENTS

| | | | |
|---|---|---|---|
| 2018/0061151 A1* | 3/2018 | Chainer | H04W 4/40 |
| 2019/0079108 A1 | 3/2019 | Takahashi et al. | |
| 2019/0111930 A1* | 4/2019 | Katsura | G06V 20/58 |
| 2019/0222809 A1 | 7/2019 | Murata et al. | |
| 2019/0333381 A1* | 10/2019 | Shalev-Shwartz | G01C 21/3602 |
| 2020/0108869 A1* | 4/2020 | You | G06T 7/50 |
| 2021/0274136 A1 | 9/2021 | Murata et al. | |

FOREIGN PATENT DOCUMENTS

| | | |
|---|---|---|
| JP | 2018148325 A | 9/2018 |
| JP | 2019053376 A | 4/2019 |
| JP | 2020190976 A * | 11/2020 |

\* cited by examiner

RECORDING APPARATUS, RECORDING METHOD, AND NON-TRANSITORY COMPUTER READABLE MEDIUM

CROSS REFERENCE TO RELATED APPLICATION

The present application is based upon and claims the benefit of priority from Japanese Patent Application No. 2019-231563, filed on Dec. 23, 2019, and Japanese Patent Application No. 2019-231564, filed on Dec. 23, 2019, the disclosure of which are incorporated herein in its entirety by reference.

BACKGROUND

The present invention relates to a recording apparatus, a recording method, and a non-transitory computer readable medium.

A recording apparatus or a recording system has been widespread that records voice data in addition to video data as imaging data.

For example, when the imaging data is recorded in a recording unit in response to a detected event, a recording apparatus disclosed in Japanese Unexamined Patent Application Publication No. 2018-082390 records first imaging data including video data and voice data in a recording unit. On the other hand, when the recording apparatus records the imaging data in the recording unit without being in response to an event, the recording apparatus records second imaging data including video data and not including voice data in the recording unit.

SUMMARY

The above-described recording apparatus is configured in consideration of protecting the privacy of a user of a vehicle. However, even in the imaging data recorded without being in response to an event, the voice data may be useful when referring to the imaging data at the time of occurrence of a trouble.

The present example embodiments have been made for solving such a problem, and are to provide a recording apparatus or the like that suitably records the imaging data including the voice data.

A recording apparatus according to the present example embodiment includes an imaging data acquisition unit, a movement information acquisition unit, and a recording control unit. The imaging data acquisition unit acquires imaging data including video data that is data of an image captured with a camera mounted on a vehicle and voice data that is data of voice collected by microphone mounted on the vehicle. The movement information acquisition unit acquires movement information including at least one of a moving speed and a moving acceleration of the vehicle. When the imaging data is recorded in a recording unit, the recording control unit determines based on the movement information whether to cause the recording unit to record first imaging data including the video data and the voice data or whether to cause the recording unit to record second imaging data including the video data but not the voice data, and causes the recording unit to record the first imaging data or the second imaging data.

A recording method according to the present example embodiment includes an imaging data acquisition step, a movement information acquisition step, a determination step, and a recording control step. In the imaging data acquisition step, imaging data is acquired that includes video data that is data of an image captured with a camera mounted on a vehicle and voice data that is data of voice collected by microphone mounted on the vehicle. In the movement information acquisition step, movement information is acquired that includes at least one of a moving speed and a moving acceleration of the vehicle. In the determination step, when the imaging data is recorded in a recording unit, whether to cause to record first imaging data including the video data and the voice data in the recording unit or whether to cause to record second imaging data including the video data but not the voice data in the recording unit is determined based on the movement information. In the recording control step, the first imaging data or the second imaging data is recorded in the recording unit based on the result of the determination.

A program according to the present example embodiment causes a computer to execute the following recording method. The recording method includes an imaging data acquisition step, a movement information acquisition step, a determination step, and a recording control step. In the imaging data acquisition step, imaging data is acquired that includes video data that is data of an image captured with a camera mounted on a vehicle and voice data that is data of voice collected by microphone mounted on the vehicle. In the movement information acquisition step, movement information is acquired that includes at least one of a moving speed and a moving acceleration of the vehicle. In the determination step, when the imaging data is recorded in a recording unit, whether to cause to record first imaging data including the video data and the voice data in the recording unit or whether to cause to record second imaging data including the video data but not the voice data in the recording unit is determined based on the movement information. In the recording control step, the first imaging data or the second imaging data is recorded in the recording unit based on the result of the determination.

According to the present example embodiments, it is possible to provide a recording apparatus or the like that suitably records voice data.

DETAILED DESCRIPTION

Figure 1:
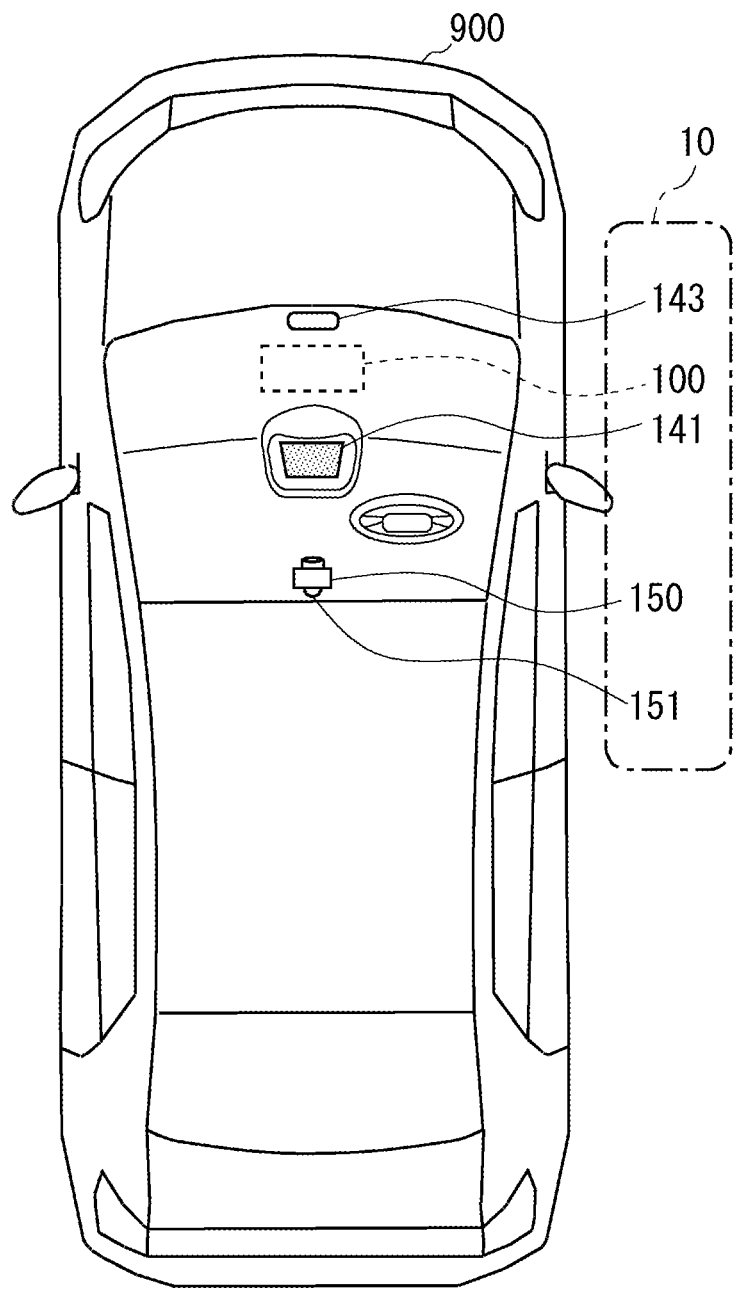
FIG. 1 is a top view of a vehicle equipped with a recording system according to a first example embodiment.

Hereinafter, the present invention will be described with reference to example embodiments of the present invention, but the invention according to claims is not limited to the following example embodiments. Moreover, not all of configurations described in the example embodiments are indispensable as means for solving the problems. For the sake of clarity, the following description and drawings are omitted and simplified as appropriate. In each drawing, the same components are designated by the same reference numerals, and will not described repeatedly as necessary.

First Example Embodiment

A first example embodiment will be described below with reference to the drawings. FIG. 1 is a top view of a vehicle equipped with a recording apparatus according to the first example embodiment. A vehicle 900 is equipped with a recording system 10 including a recording apparatus. The recording system 10 has a function as a so-called dashcam that records and plays back imaging data captured by a camera. As a function of a general dashcam, the recording system 10 records, as "event recording data", imaging data for a preset period in a playable manner when a preset trigger is received. The case where a preset trigger is received is, for example, a case where a sudden impact of a preset magnitude is detected. A driver of the vehicle can grasp a situation of the event by playing back the event recording data and watching a video of the played event recording data.

The recording system 10 includes, as main components, a recording apparatus 100, a display unit 141, a positioning information receiving unit 143, a camera 150, and a microphone 151. The recording system 10 may be a single apparatus that functions as a dashcam attached to the vehicle.

The recording apparatus 100 is an apparatus including a control circuit stored at any position of the vehicle 900, and controls each component of the recording system 10. Details of the recording apparatus 100 will be described below. The display unit 141 is a display apparatus installed such that information can be presented to the driver on a dashboard, and includes a liquid crystal panel or an OLED (Organic Light-emitting Diode) panel, for example. The display unit 141 can be provided in the recording system 10 when the recording system 10 is configured as a single apparatus.

The positioning information receiving unit 143 is installed in a central part of the dashboard of the vehicle 900, or is installed in a housing constituting the recording system 10 configured as a stand-alone dashcam. The positioning information receiving unit 143 includes an antenna for receiving positioning information required for positioning of the own vehicle from a GNSS (Global Navigation Satellite System), which is a satellite positioning system such as GPS (Global Positioning System). The positioning information receiving unit 143 may be installed at any position of the vehicle 900 as long as being capable of acquiring desired information.

The camera 150 is fixed to an upper part of a windshield in a cabin of the vehicle 900, or is installed in a housing constituting the recording system 10 configured as a stand-alone dashcam. The camera 150 is an omnidirectional camera, for example. The omnidirectional camera captures an image of a landscape around the recording system 10 with an angle of 360 degrees. Therefore, the recording system 10 can capture an image of the outside of the vehicle 900 (that is, a vehicle exterior of the vehicle 900) and the inside of the vehicle 900. The camera 150 is not limited to the omnidirectional camera, and may be a wide-angle camera or the like installed facing forward and backward of the vehicle. For example, the microphone 151 is housed in a housing common to the camera 150, and collects voice inside or outside the vehicle to generate voice data.

Figure 2:
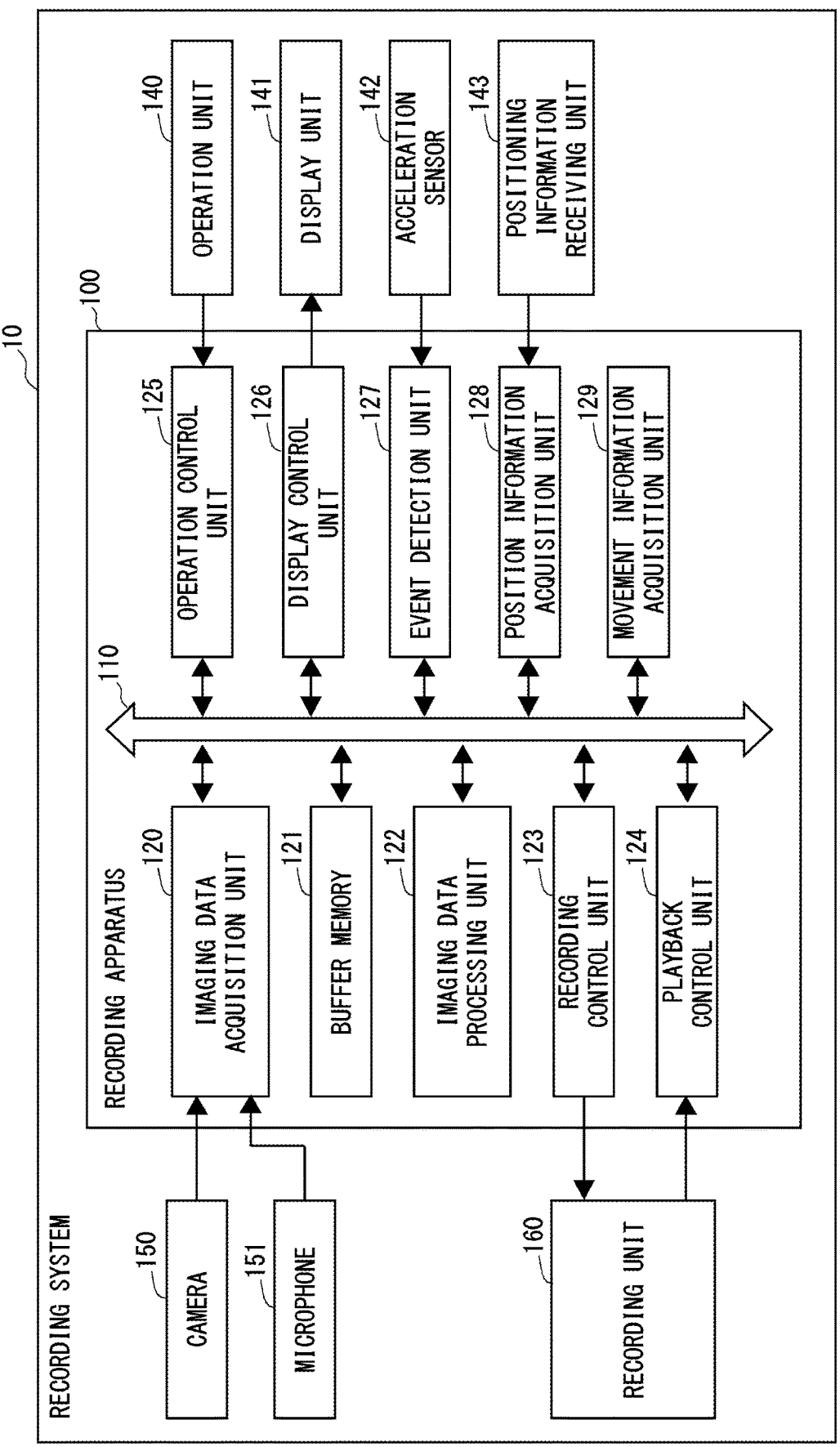
FIG. 2 is a block diagram of a recording system according to the first example embodiment.

Next, the recording system 10 will be further described with reference to FIG. 2. FIG. 2 is a block diagram of the recording system according to the first example embodiment. As shown in the drawing, the recording system 10 includes the recording apparatus 100 that controls each component and a plurality of components connected to the recording apparatus 100. The recording apparatus 100 is a control apparatus including a circuit board on which a CPU (Central Processing Unit), a GPU (Graphics Processing Unit), a memory, and a plurality of interfaces are mounted, and executes stored programs, thereby executing various kinds of processing.

The details of the recording apparatus 100 will be described below. The recording apparatus 100 includes, as main components, an imaging data acquisition unit 120, a buffer memory 121, an imaging data processing unit 122, a recording control unit 123, a playback control unit 124, an operation control unit 125, a display control unit 126, an event detection unit 127, a position information acquisition unit 128, and a movement information acquisition unit 129. The processing performed by the recording apparatus 100 is realized by programs executed by the recording apparatus 100. For convenience, each of the components is represented as being connected to a bus line 110.

The imaging data acquisition unit 120 acquires video data generated by the camera 150 and voice data generated by the microphone 151. Data including the video data and the voice data may be referred to as imaging data. In other words, the imaging data acquisition unit 120 may acquire the imaging data from the camera 150 and the microphone 151. The video data may be generated using a method such as H.264 or H.265, for example. Further, the voice data may be generated using PCM (Pulse Code Modulation), or the imaging data as moving video data including the video data and the voice data may be generated using MPEG-4 (Moving Picture Experts Group) or AVI (Audio Video Interleave) and the like. The imaging data acquisition unit 120 supplies the imaging data including the video data and the voice data to the buffer memory 121.

The buffer memory 121 is a volatile or non-volatile memory apparatus. The buffer memory 121 sequentially receives the imaging data, which are periodically generated by the camera 150, via the imaging data acquisition unit 120, and stores temporarily the received imaging data. The imaging data temporarily stored in the buffer memory 121 is data for a preset period. The buffer memory 121 sequentially erases the imaging data that has passes the preset period, or sequentially overwrites newly received imaging data. In other words, the buffer memory 121 functions as a ring buffer.

The imaging data processing unit 122 generates an imaging file in conformity with a preset method from the imaging data stored in the buffer memory 121. The preset method is, for example, a method such as H. 264 or MPEG-4 described above. The imaging file generated by the imaging data processing unit 122 includes a header and a payload. The header of the imaging file includes a date and time when the file is generated, or the like, and the payload includes the imaging data.

The imaging data processing unit 122 can generate imaging file including video data and voice data, and can also generate imaging file including video data and but voice data. In the following description, the imaging data including the video data and the voice data is referred to as first imaging data. In addition, the imaging file including the video data but not the voice data is referred to as second imaging data. The imaging data processing unit 122 generates an imaging file including the first imaging data or an imaging file including the second imaging data in response to an instruction from the recording control unit 123. The imaging data processing unit 122 supplies the generated imaging files to the recording control unit 123. The imaging file may include the first imaging data in a part of the imaging file and the second imaging data in the other part. The recording control unit 123 controls a recording unit 160 to record the imaging file generated by the imaging data processing unit 122. For example, when the event detection unit 127 detects an event, the recording control unit 123 causes the recording unit 160 to record the imaging file for the preset period according to the detection of the event as an event recording file for which overwriting is prohibited. The process in which the recording control unit 123 causes the recording unit 160 to record the event recording file is referred to as "event recording".

The recording control unit 123 causes the recording unit 160 to record the event recording file in a predetermined recording area in the recording unit 160. The predetermined recording area is a protection area specified to be prohibited from overwriting or erasing, for example. Alternatively, the event recording file supplied to the recording unit 160 by the recording control unit 123 may be recorded in a state where the file includes a flag indicating that overwriting or erasing is prohibited.

The recording control unit 123 performs "loop recording" in addition to the above-described event recording. The "loop recording" is a process of causing the recording unit 160 to regularly record the imaging data for a period during which the recording system 10 is activated. The recording control unit 123 receives the imaging file related to the loop recording from the imaging data processing unit 122, and causes the recording unit 160 to record the received imaging file in the predetermined recording area in the recording unit 160. The recording control unit 123 overwrites a new imaging file sequentially from the area where the old imaging file is recorded, after the imaging file according to the loop recording is recorded in all of the predetermined recording area of the recording unit 160. In other words, the recording control unit 123 records the loop recording in a state of a loop. Therefore, for example, a user can browse the imaging data after a point of time going back by the preset period. Note that when a compression rate of the imaging data fluctuates, a period of the imaging file recorded according to the loop recording is not constant. In addition, the capacity of the recording area for the loop recording may not be constant, or may vary.

When the recording control unit 123 records the imaging data related to the loop recording in the recording unit 160, the recording control unit 123 determines whether to record the imaging file including the first imaging data in the recording unit 160 or to record the imaging file including the second imaging data in the recording unit 160. When making such a determination, the recording control unit 123 receives information regarding a moving speed or a moving acceleration of the vehicle (movement information) from the movement information acquisition unit 129. Then, the recording control unit 123 determines from the received the movement information whether to record the imaging file including the first imaging data in the recording unit 160 or to record the imaging file including the second imaging data in the recording unit 160. The recording control unit 123 instructs the imaging data processing unit 122 to generate an imaging file including the first imaging data or the second imaging data in response to such a determination.

Note that in the following description, in the case of recording the imaging file including the first imaging data in the recording unit 160, it may be expressed as "recording the first imaging data in the recording unit 160" or "recording the first imaging data". Similarly, in the case of recording the imaging file including the second imaging data in the recording unit 160, it may be expressed as "recording the second imaging data in the recording unit 160" or "recording the second imaging data".

The playback control unit 124 performs a process of managing the imaging file recorded by the recording unit 160 and playing the recorded imaging data. The playback control unit 124 reads the selected imaging file, for example, in response to an instruction from the user, and supplies the read imaging file to the display control unit to play.

The operation control unit 125 acquires the operation information received by the operation unit 140, and outputs an operation instruction based on the operation information to each of the components. For example, when the operation control unit 125 acquires a selection instruction of the imaging file to be played from the operation unit 140, the operation control unit 125 causes the playback control unit 124 to select the imaging file recorded in the recording unit 160. When the operation control unit 125 acquires instructions regarding the playback of various data from the operation unit 140, the operation control unit 125 causes the playback control unit 124 to perform a process regarding the playback. The instructions regarding the playback of various data are, for example, starting a playback, pausing a playback, stopping a playback, and zooming in.

The display control unit 126 controls the display unit 141 to display various information. For example, the display control unit 126 causes the display unit 141 to display the imaging data being captured by the camera 150. Further, the display control unit 126 receives the imaging data supplied from the playback control unit 124, and causes the display unit 141 to display the received imaging data. When a touch sensor is superimposed on the display unit 141 as a function of the operation unit 140, the display control unit 126 causes the display unit 141 to appropriately display an icon or the like corresponding to the touch sensor.

The event detection unit 127 receives information regarding an acceleration detected by an acceleration sensor 142, and detects based on the received information regarding the acceleration that a predetermined event has occurred from a magnitude of a signal indicating the acceleration and a signal pattern. The acceleration received from the outside is an acceleration received from the vehicle 900 by the recording system 10, and an acceleration caused by an impact generated when vehicle 900 collides with another object, for example.

When the event detection unit 127 detects that the signal received from the acceleration sensor 142 corresponds to the occurrence of the predetermined event, the event detection unit 127 supplies the signal indicating that the occurrence of the event has been detected, to the imaging data processing unit 122. The occurrence of the event is, for example, an impact due to sudden braking or an impact caused by collision of an object with the vehicle.

The position information acquisition unit 128 receives a signal received by the positioning information receiving unit 143 from a positioning satellite, acquires position information as information regarding the current position from the received signal, and supplies the acquired position information to the recording control unit 123. The position information includes, for example, latitude and longitude of the vehicle at a time when the signal is received from the positioning satellite.

The movement information acquisition unit 129 acquires the movement information of the vehicle 900. The movement information includes information about at least one of the moving speed and the moving acceleration of the vehicle 900. The movement information may indicate whether a value of the moving speed or the moving acceleration is higher or lower than a preset threshold value. The movement information acquisition unit 129 acquires the moving speed from the information received by the recording apparatus 100 from the positioning information receiving unit 143. The movement information acquisition unit 129 supplies the acquired movement information to the recording control unit 123.

The movement information acquisition unit 129 may be communicably connected to an ECU (Electronic Control Unit) in the vehicle 900 via a communication bus such as CAN (Controller Area Network) to acquire and use various information of the vehicle 900. For example, the movement information acquisition unit 129 may acquire information regarding the speed and the acceleration of the vehicle 900.

Each of the components connected to the recording apparatus 100 will be described below. The recording system 10 includes, as main components, the operation unit 140, the display unit 141, the acceleration sensor 142, the positioning information receiving unit 143, the camera 150, the microphone 151, and the recording unit 160.

The operation unit 140 is a user interface that receives an operation performed by the driver on the recording system 10. The user interface may be, for example, an operation button, or a touch sensor installed to be superimposed on the display unit 141. Further, the user interface may be a receiving unit for infrared rays or wireless communication, and may receive a signal transmitted from a remote controller or the like. The operation unit 140 supplies the operation information, which is information about the received operation, to the recording apparatus 100 via a predetermined interface. The operation information is, for example, an instruction to start event recording or an instruction to play event recording data.

The display unit 141 is a display apparatus that displays various information under the control of the display control unit 126. The display unit 141 includes at least a display panel such as a liquid crystal panel or an organic EL. The display unit 141 is connected to the display control unit 126 and displays a signal supplied from the display control unit 126. The display unit 141 is configured to display an image included in the imaging data, for example.

The acceleration sensor 142 is, for example, a 3-axis acceleration sensor. The acceleration sensor 142 detects the acceleration applied to the acceleration sensor 142, and outputs information regarding the detected acceleration according to the detected acceleration. The acceleration sensor 142 is connected to the event detection unit 127, and outputs the information regarding the detected acceleration to the event detection unit 127. The acceleration sensor 142 may be a 1-axis or 2-axis acceleration sensor instead of the 3-axis acceleration sensor.

The positioning information receiving unit 143 receives information regarding the current position of the vehicle with a satellite positioning system called GPS or GNSS. The positioning information receiving unit 143 may be an antenna for receiving a positioning signal, or a communication interface for receiving the position information acquired by the vehicle. The positioning information receiving unit 143 supplies the received signal regarding the current position to the position information acquisition unit 128.

The camera 150 is an image capturing apparatus including an objective lens, an image capturing element, and an A-D (Analog to Digital) conversion element. The camera 150 captures an image including scenery around the moving vehicle, and generates imaging data which is data of the captured image. The camera 150 generates, for example, imaging data of 30 frames per second (30 fps), and supplies the generated imaging data to the imaging data acquisition unit 120 every 1/30th of a second.

The microphone 151 collects surrounding voices from the installed location, and generates voice data from the collected voices. The microphone 151 sequentially supplies the generated voice data to the imaging data acquisition unit 120.

The recording unit 160 is a recording apparatus that stores the imaging data supplied from the camera 150 and the microphone 151. The recording unit 160 is, for example, a memory card including a flash memory or a non-volatile recording apparatus such as an SSD (Solid State Drive) or an HDD (Hard Disk Drive). The recording unit 160 is connected to the recording control unit 123, receives predetermined data from the recording control unit 123, and records the received data.

Further, the recording unit 160 supplies the event file including the event recording data recorded to the playback control unit 124 according to the instruction of the playback control unit 124. The recording unit 160 may be configured to be removable from the recording system 10, or may be non-removable.

Figure 3:
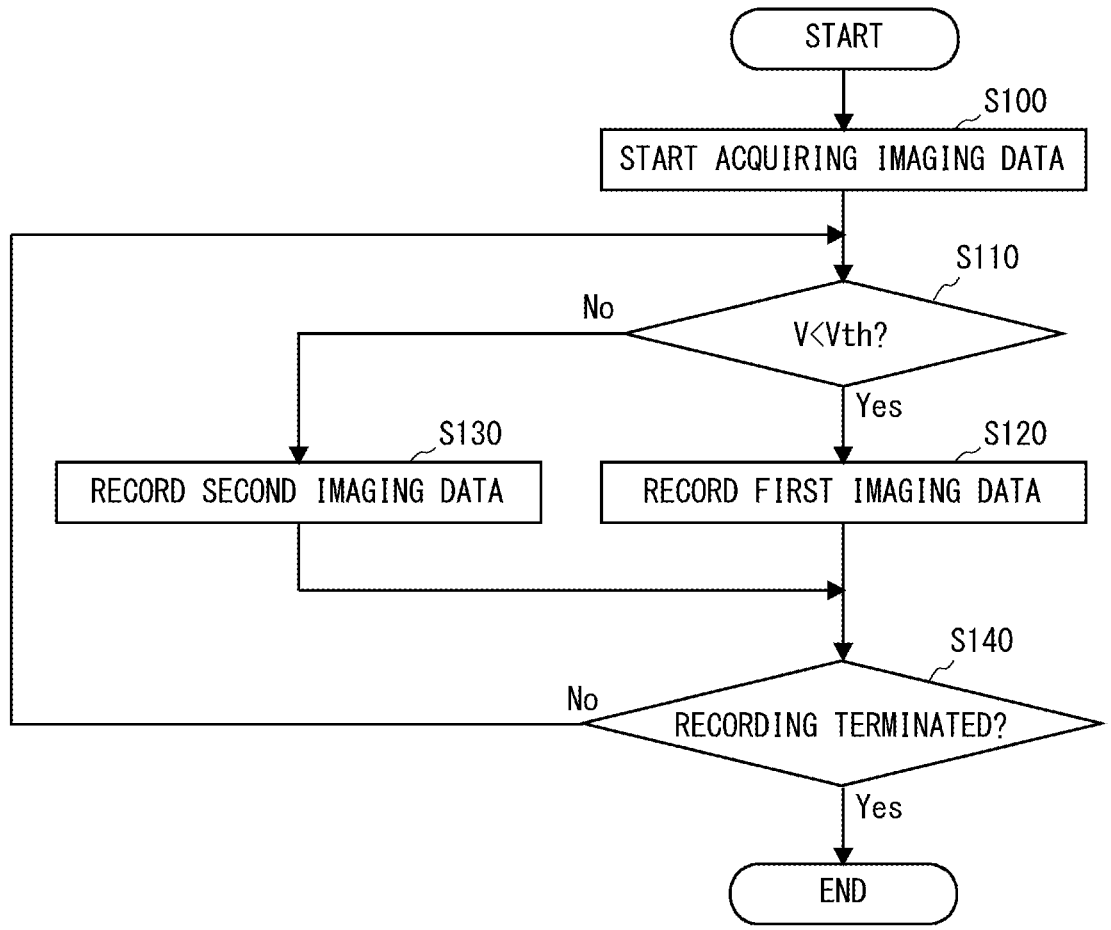
FIG. 3 is a flowchart showing an example of processing executed by the recording apparatus according to the first example embodiment.

Next, the processing executed by the recording system 10 will be described with reference to FIG. 3. FIG. 3 is a flowchart showing an example of the processing executed by the recording apparatus according to the first example embodiment. The flowchart shown in FIG. 3 shows the processing performed by the recording apparatus 100 of the recording system 10. The flowchart shown in FIG. 3 starts when the recording system 10 is activated, for example.

First, the imaging data acquisition unit 120 of the recording apparatus 100 starts acquiring imaging data (step S100).

Next, the recording apparatus 100 acquires movement information, detects a moving speed V of the vehicle 900 from the acquired movement information, and determines whether the detected moving speed V is below a preset threshold value Vth (step S110). The threshold value Vth is, for example, about 5 km/h or 8 km/h. When the moving speed V of the vehicle 900 is lower than the threshold value, the moving speed V of the vehicle 900 is zero, that is, includes a stop state. When it is determined that the moving speed V is below the threshold value Vth (step S110: Yes), the recording apparatus 100 proceeds to step S120. When it is not determined that the moving speed V is below the threshold value Vth (step S110: No), the recording apparatus 100 proceeds to step S130.

In step S120, the recording apparatus 100 records the first imaging data including the video data and the voice data (step S120). More specifically, the recording control unit 123 of the recording apparatus 100 instructs the imaging data processing unit 122 to generate the imaging file including the first imaging data. Then, when the recording control unit 123 receives the imaging file including the first imaging data from the imaging data processing unit 122, the recording control unit 123 causes the recording unit 160 to record the received imaging file.

On the other hand, in step S130, the recording apparatus 100 records the second imaging data including the video data but not the voice data (step S130). More specifically, the recording control unit 123 of the recording apparatus 100 instructs the imaging data processing unit 122 to generate the imaging file including the second imaging data. Then, when the recording control unit 123 receives the imaging file including the second imaging data from the imaging data processing unit 122, the recording control unit 123 causes the recording unit 160 to record the received imaging file.

In step S140, the recording apparatus 100 determines whether to end a series of processing (step S140). The case of ending a series of processing is, for example, a case where the generation of the imaging file is stopped by the user's operation, a case where the recording system 10 is terminated as the power supply from the vehicle 900 is stopped, or a case where the imaging data is not supplied from the camera 150. When the recording apparatus 100 does not determine to end the series of processing (step S140: No), the process returns to step S110 and the processing is continued. On the other end, when it is determined to end the series of processing (step S140: Yes), the recording apparatus 100 ends the processing.

As described above, the recording apparatus 100 determines according to the moving speed of the vehicle 900 whether to record either the first imaging data or the second imaging data. Therefore, the recording system 10 records the voice data in a state where the moving speed of the vehicle 900 is slowed down.

Figure 4:
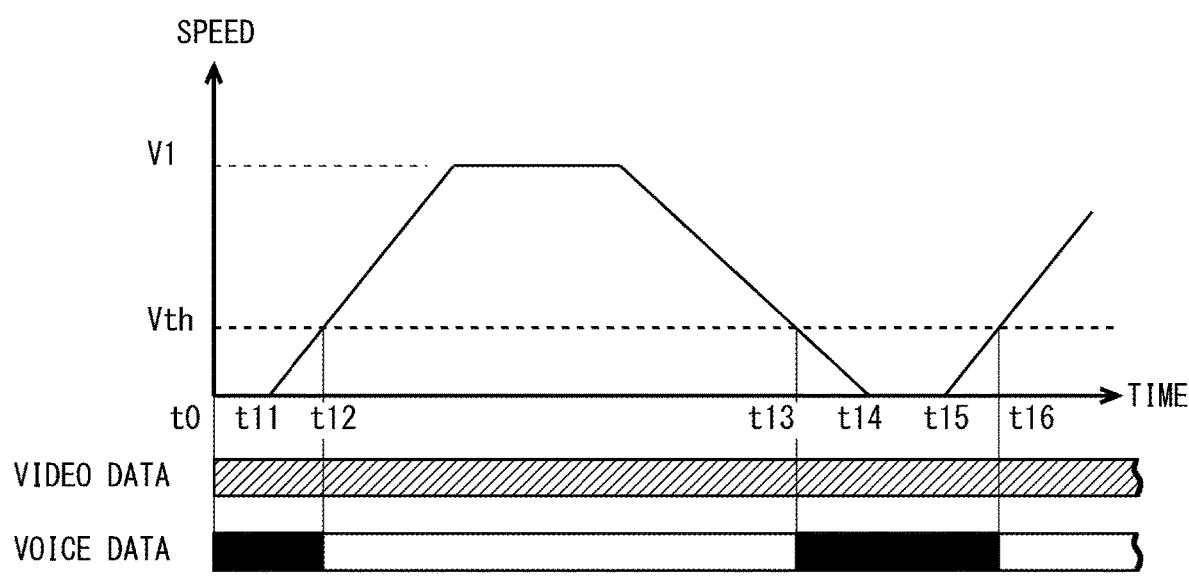
FIG. 4 is a diagram showing a relation between a speed of a vehicle and imaging data in the recording apparatus according to the first example embodiment.

Next, a relation between the moving speed of the vehicle 900 and the imaging data will be described with reference to FIG. 4. FIG. 4 is a diagram showing a relation between a speed and imaging data in the recording system according to the first example embodiment. An upper stage of FIG. 4 is a graph showing the moving speed of the vehicle 900. In the graph of the upper stage of FIG. 4, a horizontal axis indicates a time, and a vertical axis indicates a speed. A polygonal line drawn in the graph indicates the moving speed of the vehicle 900. According to the graph, the vehicle 900 is in a stop state from a time t0 to a time t11. The vehicle 900 starts moving at the time t11, and accelerates until a speed exceeds a threshold value Vth at a time t12 and reaches a speed V1. The vehicle 900 starts decelerating after traveling at the speed V1 for a while, and the moving speed is below the threshold value Vth at a time t13. Thereafter, the vehicle 900 is in a stop state at a time t14 and starts moving again at a time t15, and the moving speed exceeds the threshold value Vth at a time t16.

In a lower stage of FIG. 4, a recording status of the video data is indicated by a hatched band-shaped line. As shown in the drawing, the line indicating the recording status of the video data extends from the time t0 in parallel with the horizontal axis indicating the time without being broken. In other words, the video data is normally recorded regardless of the moving speed of the vehicle 900.

In FIG. 4, a recording status of the voice data is indicated by a white or black band-shaped line below the line indicating the recording status of the video data. Here, the black line indicates that the voice data is recorded in the recording unit 160 at the corresponding time. Further, the white line indicates that the voice data is not recorded in the recording unit 160 at the corresponding time.

As shown in FIG. 4, the vehicle 900 moves or stops at a speed below the threshold value Vth in a period from the time t0 to the time t12 and a period from a time t13 to a time t16. Correspondingly, the voice data is included in the imaging file in the period from the time t0 to the time t12 and the period from the time t13 to the time t16.

As described above, when the moving speed of the vehicle 900 is below the threshold value Vth, the recording apparatus 100 causes the recording unit 160 to record the first imaging data including the voice data. On the other hand, when the moving speed of the vehicle 900 exceeds the threshold value Vth, the recording system 10 causes the recording unit 160 to record the second imaging data not including the voice data. With such a configuration, the recording apparatus 100 can record voice data when the other vehicle of road rage with respect to the vehicle 900 stops the vehicle 900 and a passenger of the other vehicle gets off and then approaches the vehicle 900, for example.

The first example embodiment has been described above. The recording apparatus 100 according to the first example embodiment is not limited to the above-described configuration. The recording apparatus 100 according to the first example embodiment may be, for example, a configuration including the camera 150, the microphone 151, and recording unit 160. Further, the recording apparatus 100 may be a configuration similar to that of the recording system 10. The recording apparatus 100 does not have to be housed in one console. The recording apparatus 100 may be in a state of being connected via wired or wireless communication.

The camera 150 may be the omnidirectional camera as described above, or may be a plurality of cameras that capture an image of at least the outside of the vehicle 900. The recording apparatus 100 may acquire map information, and may record the first imaging data on condition that the moving speed V of the vehicle 900 is below the threshold value Vth and the vehicle 900 exists in a specific area, from the acquired map information and the position information of the vehicle 900. The specific area may be, for example, in the vicinity of a tree-way junction, an intersection, a parking lot, or a traffic light. The specific area may be an area such as a road shoulder deviated from the road.

As described above, according to the first example embodiment, it is possible to provide the recording system or the like that suitably records the voice data.

Second Example Embodiment

A second example embodiment will be described below. A hardware configuration of a recording system according to the second example embodiment is the same as that of the first example embodiment. The second example embodiment differs from the first example embodiment in terms of a condition for determining that the first imaging data is recorded.

Figure 5:
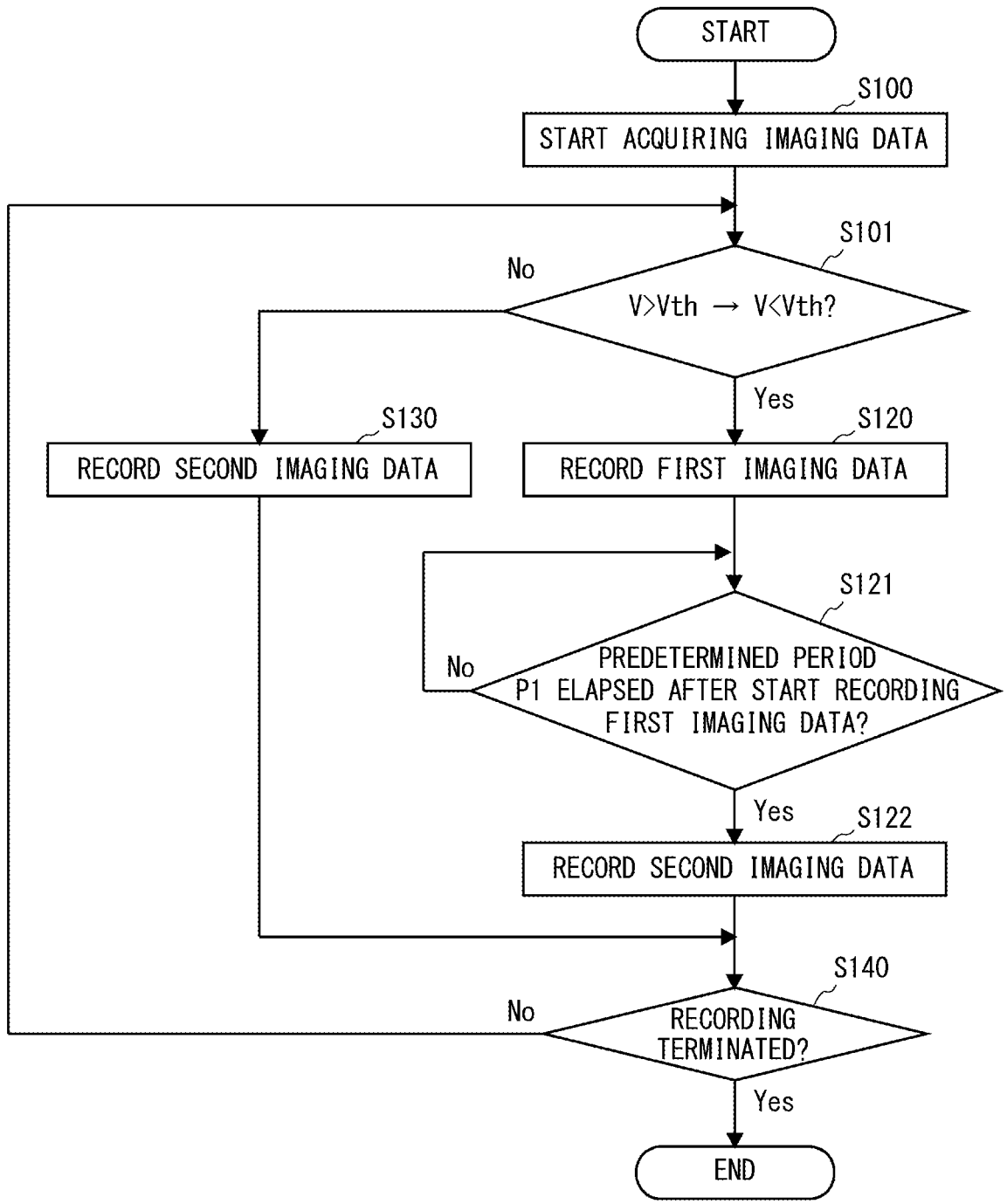
FIG. 5 is a flowchart showing an example of processing executed by a recording apparatus according to a second example embodiment.

FIG. 5 is a flowchart showing an example of processing executed by the recording system according to the second example embodiment. The flowchart shown in FIG. 5 shows the processing performed by the recording apparatus 100 of the recording system 10. The flowchart shown in FIG. 5 is different from the flowchart shown in FIG. 3 in that the process includes step S101 instead of step S110 and the processing subsequent to step S120 are different. In the following description, the same processing as the above-described flowchart may be omitted as appropriate.

First, the imaging data acquisition unit 120 of the recording apparatus 100 starts acquiring imaging data (step S100).

Next, the recording apparatus 100 acquires movement information, detects a moving speed V of the vehicle 900 from the acquired movement information, and determines whether the detected moving speed V changes from a value higher than the preset threshold value Vth to a value lower than the threshold value Vth (step S101). In other words, the movement information acquisition unit 129 of the recording apparatus 100 acquires the moving speed of the vehicle 900 every preset period (for example, 100 milliseconds), for example. Therefore, the recording control unit 123 can monitor a transition of the moving speed V from the moving speed acquired most recently and the moving speed acquired immediately before that, for example. When the recording apparatus 100 determines that the moving speed V has changed from the value higher than the threshold value Vth to the value lower than the threshold value Vth (step S101: Yes), the process proceeds to step S120. On the other hand, when the recording apparatus 100 does not determine that the moving speed V has changed from the value higher than the threshold value Vth to the value lower than the threshold value Vth (step S101: No), the process proceeds to step S130.

In step S120, the recording apparatus 100 records the first imaging data (step S120). After the recording apparatus 100 records the first imaging data, the process proceeds to step S121.

In step S121, the recording apparatus 100 determines whether a predetermined period P1 has elapsed after the start of recording the first imaging data (step S121). More specifically, for example, the recording apparatus 100 determines that the predetermined period P1 has elapsed when the recording apparatus 100 stores a time when the first imaging data is supplied to the recording unit 160, counts up the counter from the stored time, and counts the preset number of counts. The predetermined period P1 is a preset period, for example, 3 minutes. When the recording apparatus 100 does not determine that the predetermined period P1 has elapsed after the start of recording the first imaging data (step S121: No), the recording apparatus 100 repeats step S121. When the recording apparatus 100 determines that the predetermined period P1 has elapsed after the start of recording the first imaging data (step S121: Yes), the recording apparatus 100 ends the recording of the first imaging data, and starts recording the second imaging data (step S122). Then, the recording apparatus 100 proceeds to step S140.

In step S130, the recording apparatus 100 records the second imaging data including the video data but not the voice data (step S130). Then, the recording apparatus 100 proceeds to step S140.

In step S140, the recording apparatus 100 determines whether to end a series of processing (step S140). When the recording apparatus 100 does not determine to end the series of processing (step S140: No), the process returns to step S110 and the processing is continued. On the other end, when it is determined to end the series of processing (step S140: Yes), the recording apparatus 100 ends the processing.

As described above, the recording apparatus 100 determines according to the change in the moving speed of the vehicle 900 whether to record either the first imaging data or the second imaging data. Therefore, the recording apparatus 100 records the voice data when the moving speed of the vehicle 900 changes from the value higher than the threshold value to the value lower than the threshold value.

Figure 6:
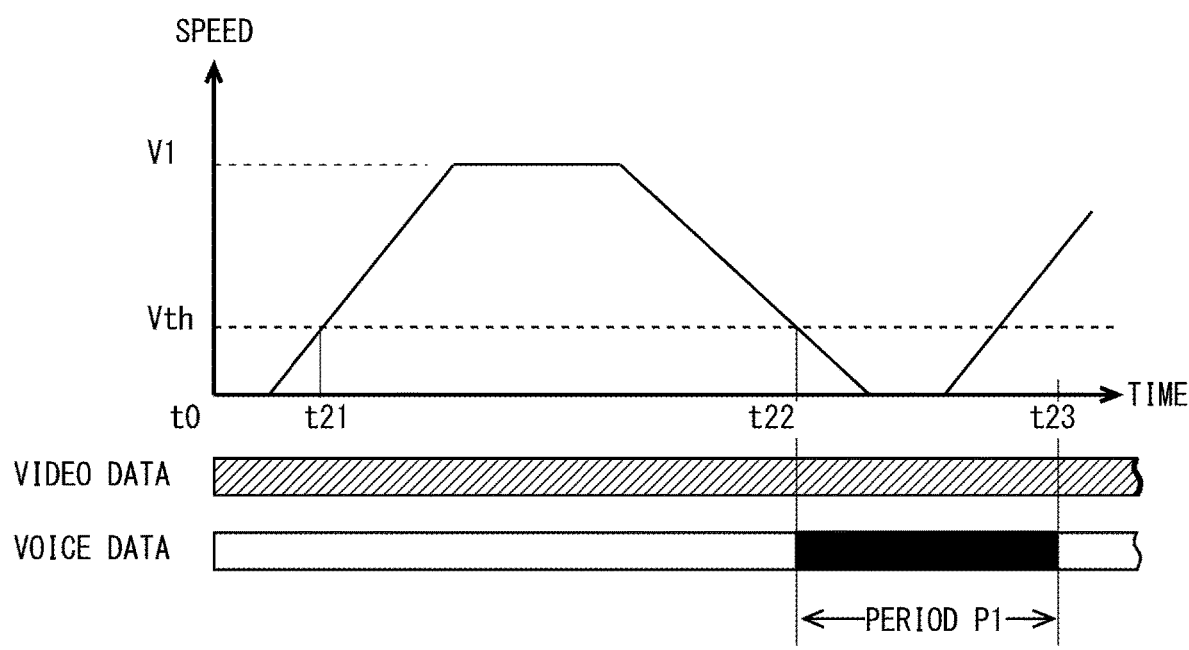
FIG. 6 is a diagram showing a relation between a speed of the vehicle and the imaging data in the recording apparatus according to the second example embodiment.

Next, a relation between the moving speed of the vehicle 900 and the imaging data according to the present example embodiment will be described with reference to FIG. 6. FIG. 6 is a diagram showing a relation between a speed of the vehicle and the imaging data in the recording system according to the second example embodiment. An upper stage of FIG. 6 is a graph showing the moving speed of the vehicle 900.

According to the graph, the vehicle 900 increases the moving speed from the stop state, starts decelerating after the moving speed exceeds a threshold value Vth at a time t21 and increases up to a speed V1 to reach a speed below the threshold value Vth at a time t22, and is stopped temporarily. Further, the vehicle 900 then starts moving again and increases the moving speed.

Similarly to FIG. 4, a recording status of the video data is indicated by a hatched band-shaped line at a lower stage of FIG. 6. Further, a recording status of the voice data is indicated by a white or black band-shaped line below the line indicating the recording status of the video data.

As shown in FIG. 6, the recording apparatus 100 records the first imaging data including the voice data in the imaging file from a time t22 when the moving speed V of the vehicle 900 changes from a state of being higher than the threshold value Vth to a state of being lower than the threshold value Vth to a time t23 when a period P1 elapses. Therefore, the recording apparatus 100 according to the present example embodiment can suitably record the voice data when an event occurs due to the influence of road rage or the like in a case where the speed of the vehicle 900 decelerates and falls below the threshold value. The second example embodiment has been described above. According to the second example embodiment, it is possible to provide the recording system or the like that suitably records the voice data.

Third Example Embodiment

A third example embodiment will be described below. A hardware configuration of a recording system according to the third example embodiment is the same as that of the first example embodiment. However, the recording system according to the present example embodiment acquires a moving acceleration of the vehicle 900, as movement information. The third example embodiment differs from the example embodiments described above in terms of a condition for determining that the first imaging data is recorded.

Figure 7:
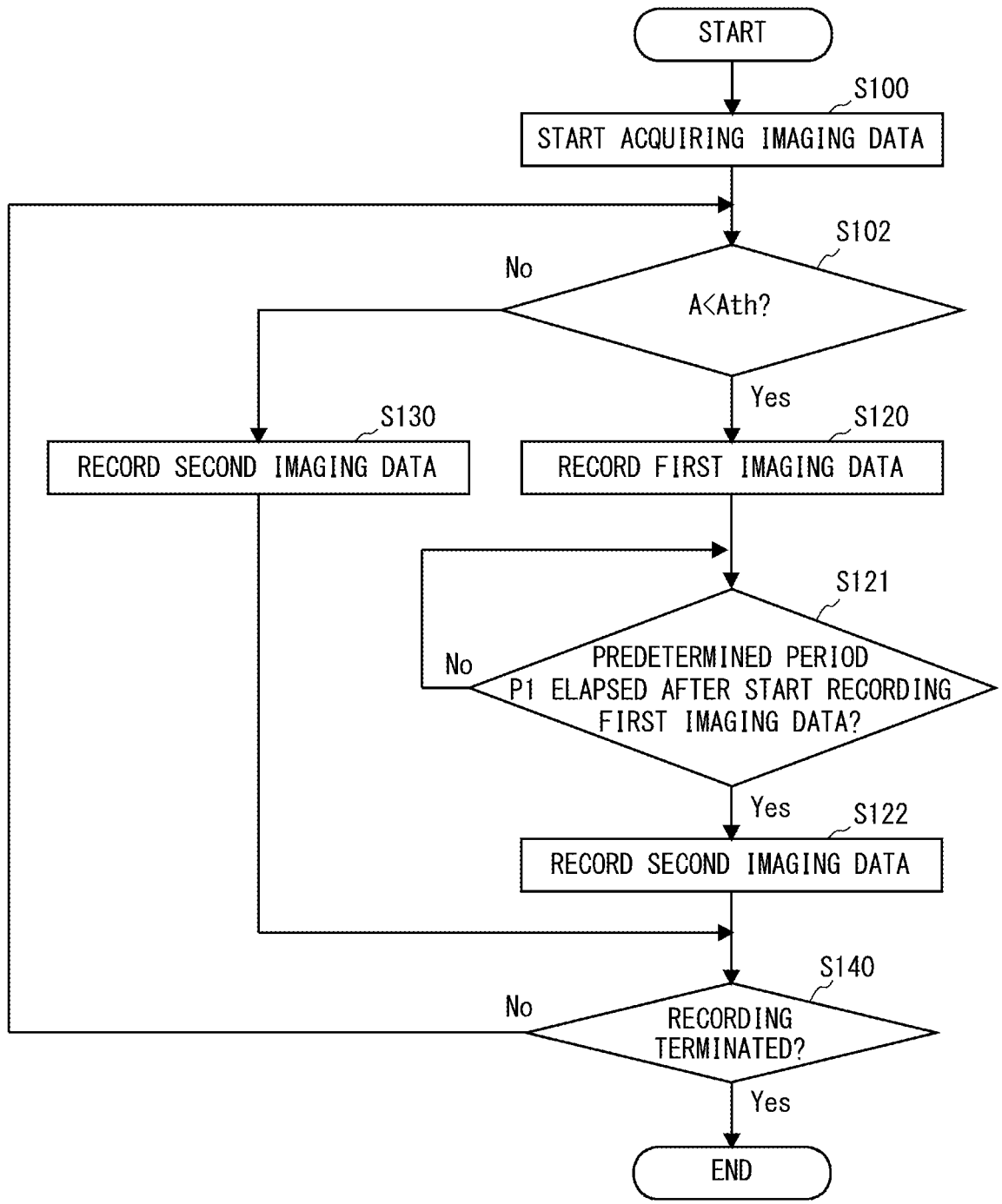
FIG. 7 is a flowchart showing an example of processing executed by a recording apparatus according to a third example embodiment.

FIG. 7 is a flowchart showing an example of processing executed by the recording system according to the third example embodiment. The flowchart shown in FIG. 7 is different from the flowchart shown in FIG. 3 in that the process includes step S102 instead of step S110.

In the recording apparatus 100 according to the present example embodiment, the imaging data acquisition unit 120 starts acquiring imaging data (step S100), movement information is acquired, and a moving acceleration A of the vehicle 900 is detected from the acquired movement information. Then, the recording apparatus 100 determines whether the detected moving acceleration A changes from a value higher than a preset threshold value Ath to a value lower than the threshold value Vth (step S102). Here, it is assumed that the value of the acceleration A is a positive value when the vehicle 900 is accelerating and is a negative value when the vehicle 900 is decelerating. For example, the movement information acquisition unit 129 acquires the moving speed of the vehicle 900 every preset period (for example, 100 milliseconds), and calculates a moving acceleration of the vehicle 900 from the moving speed obtained most recently and the moving speed acquired immediately before that.

When the recording apparatus 100 determines that the moving acceleration A is lower than the threshold value Ath (step S102: Yes), the process proceeds to step S120. On the other hand, when the recording apparatus 100 does not determine that the moving acceleration A is lower than the threshold value Ath (step S102: No), the process proceeds to step S130. Subsequent processes are the same as those of the flowchart according to the second example embodiment shown in FIG. 5.

Figure 8:
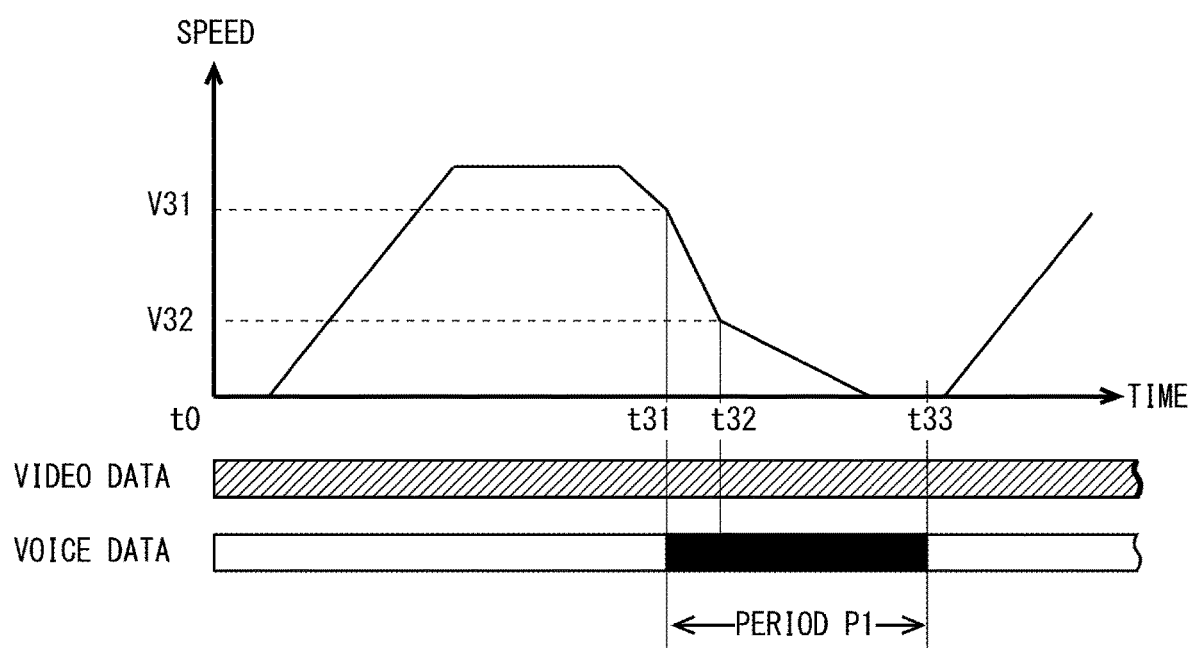
FIG. 8 is a diagram showing a relation between a speed of the vehicle and the imaging data in the recording apparatus according to the third example embodiment.

A relation between the moving speed of the vehicle 900 and the imaging data according to the present example embodiment will be described below with reference to FIG. 8. FIG. 8 is a diagram showing a relation between a speed of the vehicle and the imaging data in the recording system according to the third example embodiment. An upper stage of FIG. 8 is a graph showing the moving speed of the vehicle 900.

According to the graph, the vehicle 900 increases the moving speed from the stop state, then travels at a constant speed, and continuously decelerates. The vehicle 900 decelerates to a speed V31 at a time t31, and then to a speed V32 at a time t32. Further, the vehicle 900 further decelerates slowly thereafter, stops temporarily, and then increases the speed again.

Similarly to FIGS. 4 and 6, a recording status of the video data is indicated by a hatched band-shaped line at a lower stage of FIG. 8. Further, a recording status of the voice data is indicated by a white or black band-shaped line below the line indicating the recording status of the video data.

In the above-described status, from a time t31 to a time t32, the moving speed of the vehicle 900 is rapidly decelerated from V31 to V32, which is a speed lower than V31. In other words, the acceleration A of the vehicle 900 is a value lower than the threshold value Ath. Therefore, as shown in FIG. 8, the recording apparatus 100 records the first imaging data including the voice data in the imaging file from the time t31 when the moving acceleration A of the vehicle 900 changes to a state of being lower than the threshold value Ath to a time t33 when the period P1 elapses. Therefore, the recording apparatus 100 according to the present example embodiment can appropriately record the voice data as the vehicle 900 is suddenly decelerated due to the influence of the other vehicle. The third example embodiment has been described above. According to the third example embodiment, it is possible to provide the recording system or the like that suitably records the voice data.

Fourth Example Embodiment

A fourth example embodiment will be described below. A hardware configuration of a recording system according to the fourth example embodiment is the same as that of the first example embodiment. However, the recording system according to the present example embodiment includes a process when an event is detected.

Figure 9:
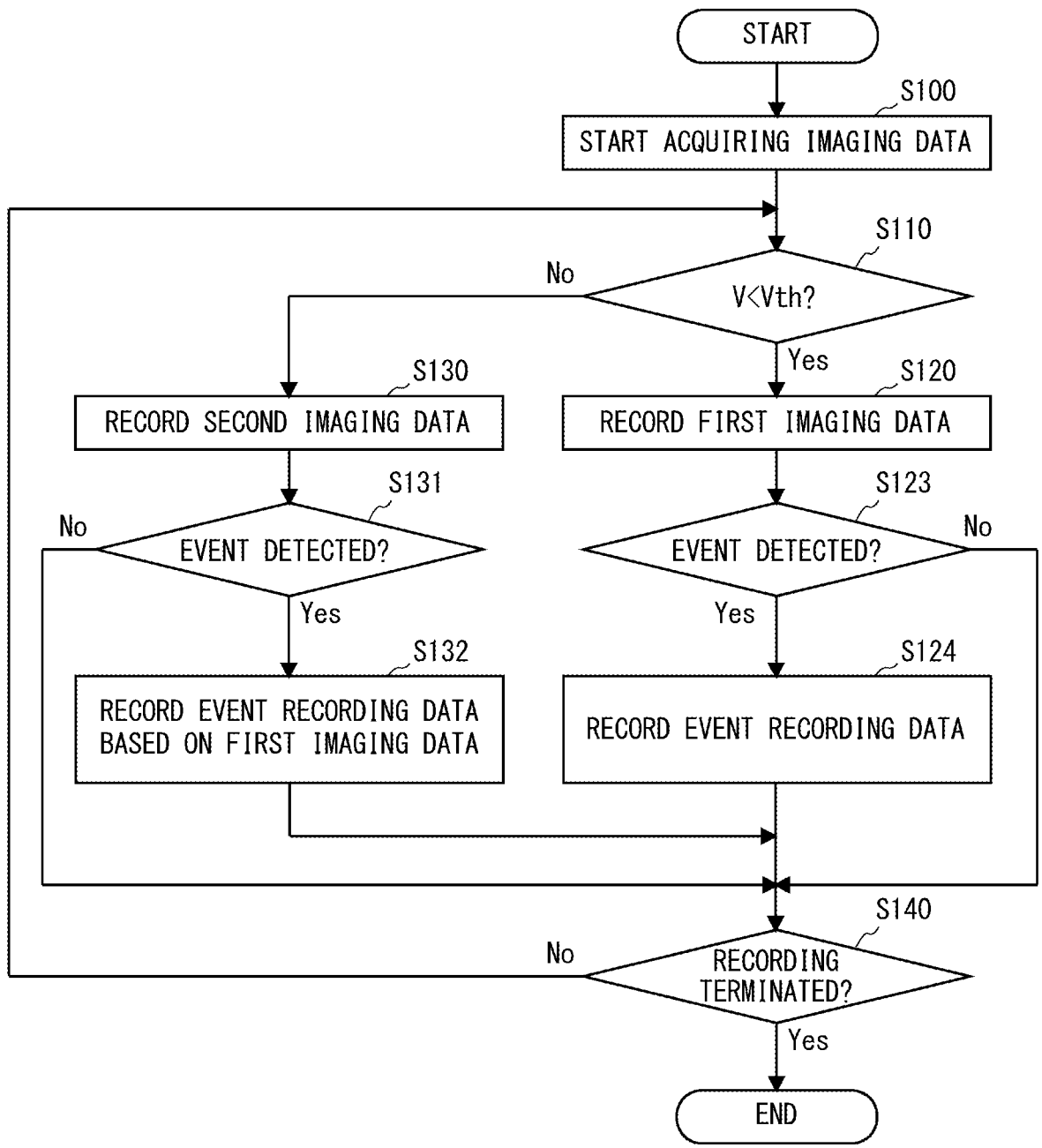
FIG. 9 is a flowchart showing an example of processing executed by a recording apparatus according to a fourth example embodiment.

FIG. 9 is a flowchart showing an example of processing executed by the recording system according to the fourth example embodiment. The flowchart shown in FIG. 9 is different from the flowchart shown in FIG. 3 in that the process of detecting an event is provided between step S120 and step S140 and between S130 and step S140.

The recording apparatus 100 constantly determines based on the signal received from the acceleration sensor 142 whether an event occurs during a period in which the recording system 10 is operating. When an event is detected during a period in which the first imaging data is being recorded, the recording apparatus 100 records the first imaging data as event recording data in the recording unit 160. When an event is detected during a period in which the second imaging data is being recorded, the recording apparatus 100 records the first imaging data as event recording data in the recording unit 160.

In FIG. 9, after the process of step S120, the recording apparatus 100 determines whether the event detection unit 127 detects an event (step S123). When the recording apparatus 100 determines that the event detection unit 127 detects the event (step S123: Yes), the process proceeds to step S124. On the other hand, when the recording apparatus 100 does not determine that the event detection unit 127 detects the event (step S123: No), the process proceeds to step S140.

In step S124, the recording apparatus 100 records the first imaging data as event recording data. Specifically, the recording apparatus 100 records the first imaging data for a predetermined period before and after the detection of the event detected in step S123, as event recording data for which overwriting is prohibited, in the recording unit 160 (step S124). The predetermined period before and after the detection of the event is, for example, 30 seconds before and after. After the recording apparatus 100 records the event recording data, the process proceeds to step S140.

After the process of step S130, the recording apparatus 100 determines whether the event detection unit 127 detects an event (step S131). When the recording apparatus 100 determines that the event detection unit 127 detects the event (step S131: Yes), the process proceeds to step S132, while when the recording apparatus 100 does not determine that the event detection unit 127 detects the event (step S131: No), the process proceeds to step S140.

In step S132, the recording apparatus 100 records the first imaging data as event recording data. Specifically, the imaging data subjected to loop recording is the second imaging data, but the recording apparatus 100 records the first imaging data for a predetermined period before and after the detection of the event detected in step S131, as event recording data for which overwriting is prohibited, in the recording unit 160 (step S132). After the recording apparatus 100 records the event recording data, the process proceeds to step S140.

As described above, the recording apparatus 100 according to the fourth example embodiment determines based on the moving speed of the vehicle 900 whether to record the first imaging data or the second imaging data. The recording apparatus 100 according to the fourth example embodiment further records the first imaging data as event recording data regardless of the speed of the vehicle 900 when the event is detected.

With such a configuration, the recording apparatus 100 according to the fourth example embodiment records an imaging file including voice data when the moving speed of the vehicle 900 decreases, and records the imaging file including the voice data regardless of the moving speed of the vehicle 900 when the event is detected. As described above, according to the fourth example embodiment, it is possible to provide the recording system or the like that suitably records the voice data regardless of whether the event has occurred.

In the present example embodiment, as step S110, a process of recording the first imaging data is adopted in a case where the moving speed V is lower than the threshold value Vth. However, instead of the above-described process, as described in the second example embodiment, the process when the moving speed V changes from the state of being higher than the threshold value Vth to the state of being lower than the threshold value Vth may be adopted. Instead of the above-described process, as described in the third example embodiment, the process when the moving acceleration A changes to the state of being lower than the threshold value Ath may be adopted. In addition, the flowchart shown in FIG. 9 is an example, and the fourth example embodiment may be made up of other steps.

Fifth Example Embodiment

Figure 10:
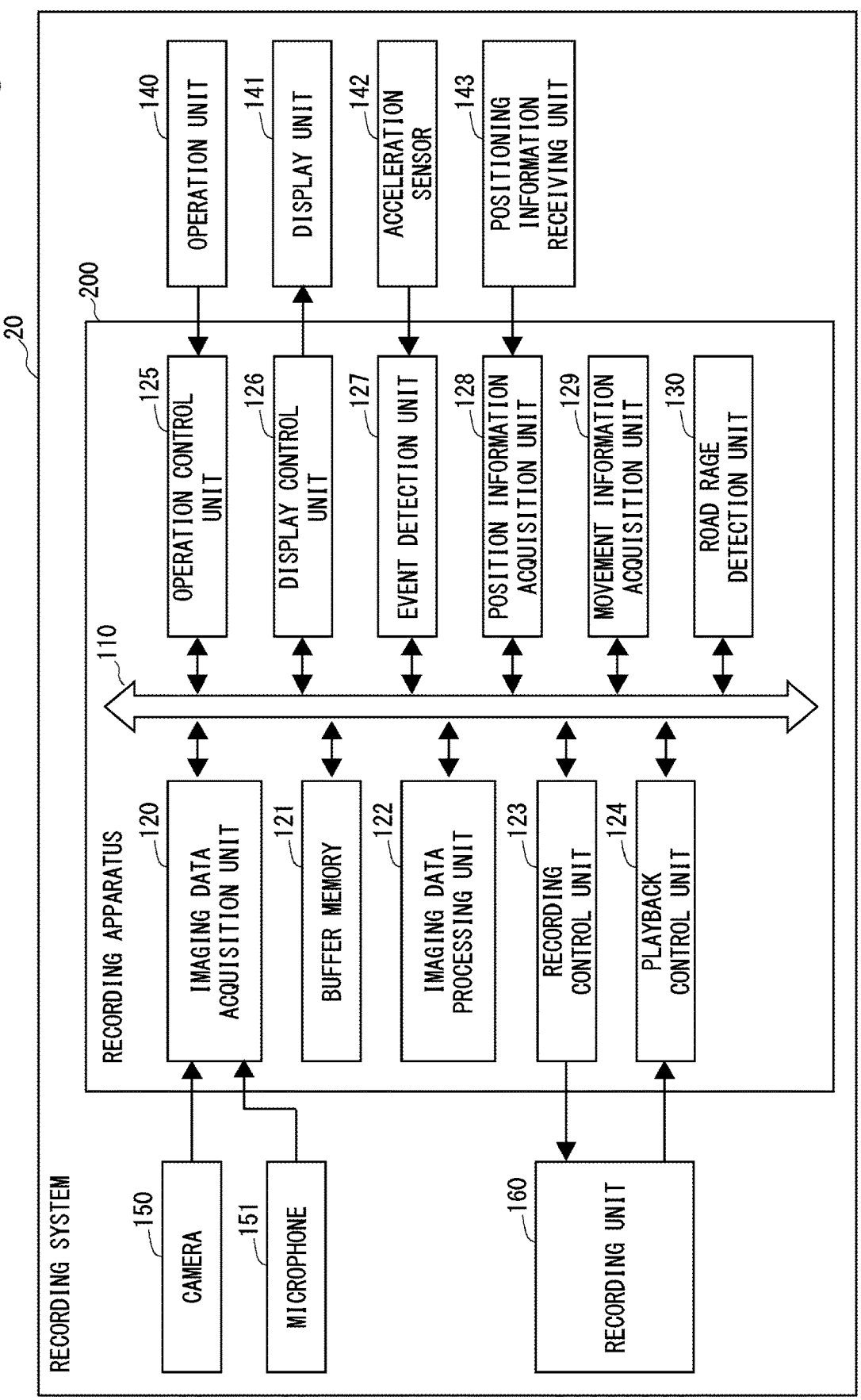
FIG. 10 is a block diagram of a recording system according to a fifth example embodiment.

A fifth example embodiment will be described below. The fifth example embodiment is different from the example embodiments described above in that the recording apparatus further includes a road rage detection unit. FIG. 10 is a block diagram of a recording system according to the fifth example embodiment. A recording system 20 according to the fifth example embodiment includes a recording apparatus 200. The recording apparatus 200 includes a road rage detection unit 130 in addition to the configuration of the recording apparatus 100 described above.

The road rage detection unit 130 detects road rage of the other vehicle traveling around the vehicle 900. In other words, the road rage detection unit 130 detects that the own vehicle is subjected to the road rage. The road rage is detected by analyzing the imaging data received from the camera 150 using a preset method, for example. For example, the road rage detection unit 130 recognizes the other vehicle included in the video data included in the imaging data with image processing, and detects road rage when the recognized movement of the other vehicle corresponds to the road rage. The movement corresponding to the road rage is, for example, sudden acceleration, sudden deceleration, meandering driving, blinking of headlights and brake lamps, and abnormal approach during traveling. Various methods of detecting the road rage are already known to those skilled in the art. Therefore, the details will not be described here. The road rage detection unit 130 may use data of a ranging sensor (not shown). The "road rage" in the present example embodiment is a behavior of the other vehicle at any of the front, the rear, and the side of the vehicle 900, which may cause harm to the vehicle 900. When the road rage detection unit 130 detects the road rage, the road rage detection unit 130 supplies a signal indicating that the road rage is detected, to the recording control unit 123.

Figure 11:
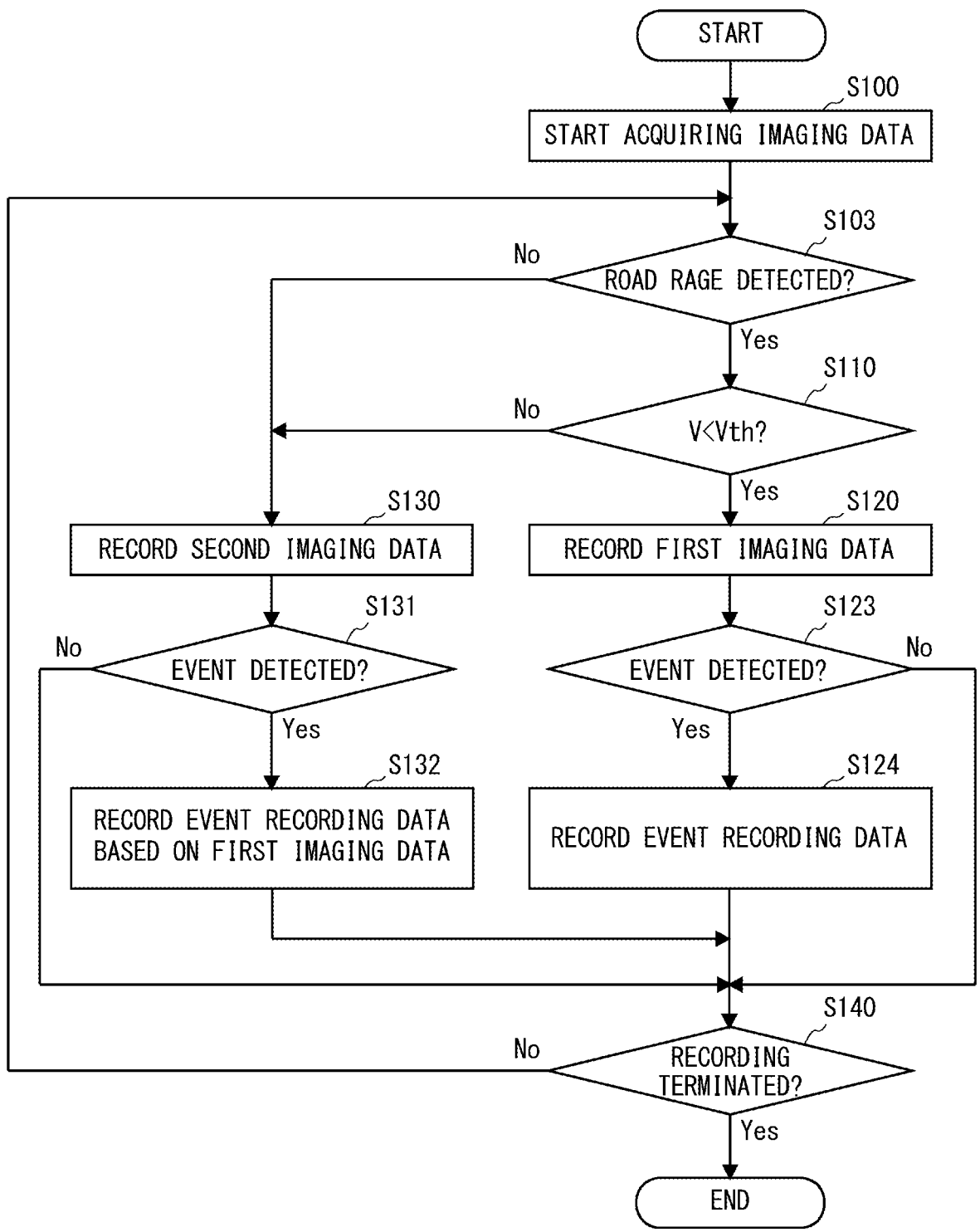
FIG. 11 is a flowchart showing an example of processing executed by a recording apparatus according to the fifth example embodiment.

Processing of the recording apparatus 200 according to the fifth example embodiment will be described below with reference to FIG. 11. FIG. 11 is a flowchart showing an example of the processing executed by the recording system according to the fifth example embodiment. The flowchart shown in FIG. 11 is different from the flowchart shown in FIG. 9 in that processing of the road rage detection unit is added.

After the recording apparatus 200 starts acquiring imaging data (step S100), the recording apparatus 200 determines whether road rage is detected (step S103). When the recording apparatus 200 determines that the road rage is detected (step S103: Yes), the process proceeds to step S110, and the recording apparatus 200 determines whether the moving speed V of the vehicle 900 is smaller than the threshold value Vth (step S110). On the other hand, when the recording apparatus 200 does not determine that the road rage is detected (step S103: No), the process proceeds to step S130, and the recording apparatus 200 starts recording second imaging data (step S130).

The processes from the above-described process to the process before step S140 are the same as those of the flowchart shown in FIG. 9. In step S140, when the recording apparatus 200 does not determine that the recording is completed (step S140: No), the process returns to step S103, and the recording apparatus 200 determines again whether the road rage is detected. Other processes are the same as the processes described with reference to FIG. 9.

In the present example embodiment, as step S110, a process of recording the first imaging data is adopted in the case where the moving speed V is lower than the threshold value Vth. However, instead of the above-described process, as described in the second example embodiment, the process when the moving speed V changes from the state of being higher than the threshold value Vth to the state of being lower than the threshold value Vth may be adopted. Instead of the above-described process, as described in the third example embodiment, the process when the moving acceleration A changes to the state of being lower than the threshold value Ath may be adopted. In addition to the above-described process, as described in the fourth example embodiment, the process of detecting the event may be performed. In addition, the flowchart shown in FIG. 11 is an example, and the fifth example embodiment may be made up of other steps.

As described above, the recording apparatus 200 according to the fifth example embodiment includes the road rage detection unit 130 to detect the road rage, and determines from the movement information of the vehicle 900 whether the imaging data including the voice data is recorded. Therefore, according to the fifth example embodiment, it is possible to provide the recording system or the like that suitably records the voice data during the road rage.

Sixth Example Embodiment

Figure 12:
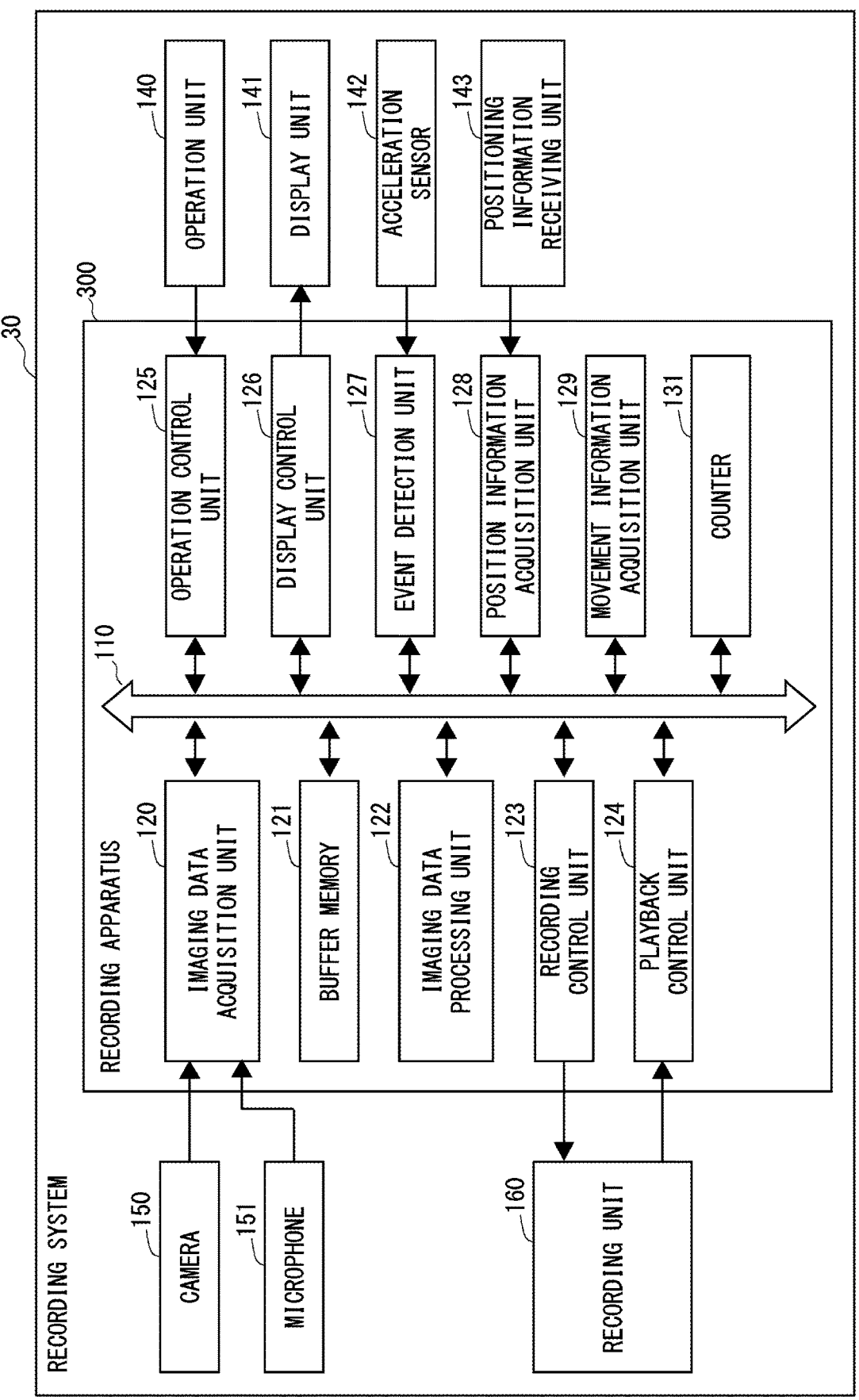
FIG. 12 is a block diagram showing a recording system according to a sixth example embodiment.

A sixth example embodiment will be described below. The recording apparatus of the sixth example embodiment is different from that of the first example embodiment in that the recording apparatus includes a counter. FIG. 12 is a block diagram showing the recording system according to the sixth example embodiment. A recording system 30 shown in FIG. 12 includes the recording apparatus 300 instead of the recording apparatus 100 according to the first example embodiment. The recording apparatus 300 is different from the recording apparatus 100 according to the first example embodiment in that a counter 131 is provided.

After the first imaging data is recorded, the counter 131 counts the preset number of counts by using the recording of the first imaging data as a trigger. The counter 131 supplies a signal indicating that the preset number of counts has been reached to the recording control unit 123. The preset number of counts may be the number of counts that is incremented in response to a clock signal transmitted by a semiconductor or a crystal.

As described above, the recording control unit 123 causes the recording unit 160 to record the imaging file by loop recording. Therefore, the recording control unit 123 overwrites the new imaging file sequentially from the area where the old imaging file is recorded. However, the recording control unit 123 in the present example embodiment does not erase the imaging file including the first imaging data until the preset number of counts is exceeded. In other words, after recording the first imaging data, the recording control unit 123 overwrites or erases the recorded first imaging data after exceeding the preset number of counts.

Figure 13:
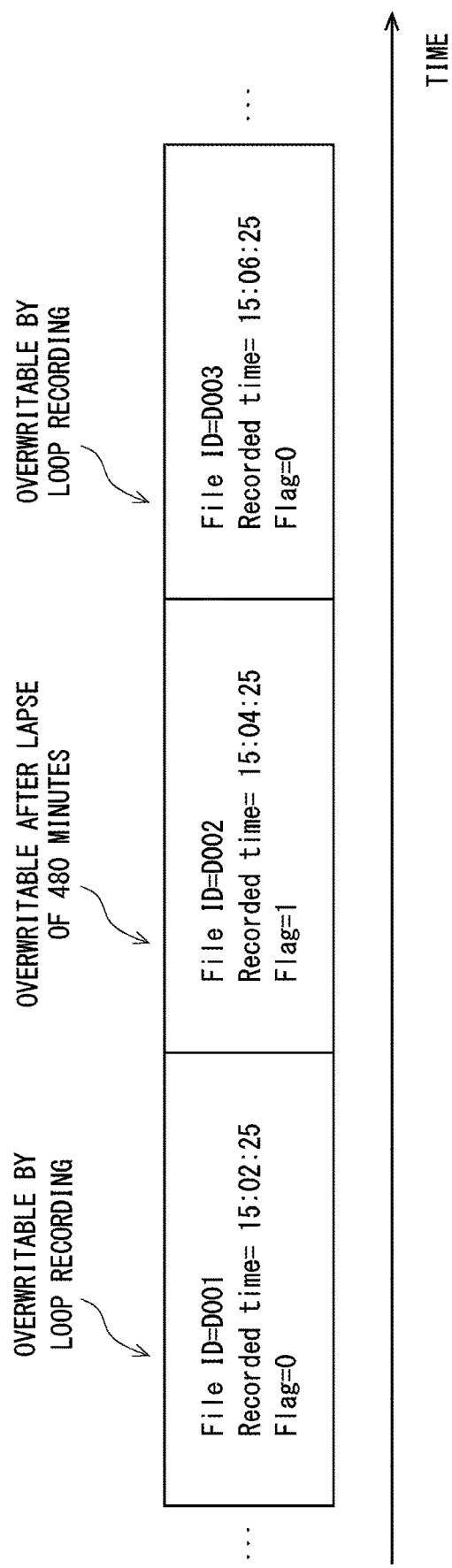
FIG. 13 is a diagram showing an example an imaging file generated by a recording apparatus according to the sixth example embodiment.

FIG. 13 is a diagram showing an example of an imaging file generated by the recording apparatus according to the sixth example embodiment. In FIG. 13, an arrow extending from left to right indicates a time. A rectangle shown above the arrow indicates an imaging file recorded by the recording unit 160 under the control of the recording control unit 123. The imaging file constitutes an independent file for each preset period. FIG. 13 shows three consecutive imaging files as an example of imaging files. Each of the imaging files shown in FIG. 13 includes imaging data for 2 minutes. Each of the imaging files includes various information as header information. For example, the imaging file includes a flag indicating that the imaging file includes an identifier, recorded time, and voice data.

For example, the imaging file on the left side has a file identifier (File ID) of D001. The imaging file D001 includes time information of 15:02:25 as a recorded time. Further, a flag indicating that the imaging file includes the voice data is indicated by 0. When the flag is 1, the imaging file includes the voice data. When the flag is 0, the imaging file does not include the voice data. Therefore, the imaging file D001 does not include the voice data.

Similarly, the central imaging file has a file identifier of D002. The imaging file D002 includes time information of 15:04:25 as a recorded time. Further, a flag indicating that the imaging file includes the voice data is indicated by 1. When the flag is 1, the imaging file includes the voice data. That is, the imaging file D002 includes the voice data.

Further, the imaging file on the right side has a file identifier (File ID) of D003. The imaging file D003 includes time information of 15:06:25 as a recorded time. Further, a flag indicating that the imaging file includes the voice data is indicated by 0. That is, the imaging file D003 does not include the voice data.

The imaging files recorded in the recording unit 160 are sequentially erased in order from the oldest by the recording control unit 123 that performs loop recording. For example, the recording unit 160 is set to be capable of storing 15 imaging files as loop recording. In this case, the recording unit 160 records 15 imaging files for 2 minutes, that is, the imaging data for 30 minutes. Therefore, the imaging file not including the voice data is erased by being overwritten with another new imaging file after 30 minutes have elapsed. On the other hand, the imaging file including the voice data is not overwritten until 480 minutes (8 hours) as a preset period have elapsed from the recorded time included in the header. In other words, the imaging file having the flag of 1 can be overwritten after the counter counts the lapse of 480 minutes after being recorded. The counting period is an example, and 480 minutes may be any period. Any period may be set to infinity. That is, when the flag is 1, overwriting prohibition may be set. In other words, the priority of overwriting the first imaging data is set lower than that of the second imaging data.

With such a configuration, the recording apparatus according to the present example embodiment prevents the imaging file, in which some events may be recorded, from being erased. Therefore, according to the present example embodiment, it is possible to provide the recording system or the like that suitably records the voice data including counterpart's speech and behavior and prevents the recorded imaging data from being erased when the vehicle decelerates and stops due to the road rage during the traveling, for example. Further, although not being detected as an event such as an accident, for a trouble with pedestrians occurring during deceleration or stop, it is also possible to suitably record the voice data including counterpart's speech and behavior. The configuration according to the present example embodiment can be combined with the various example embodiments described above.

Seventh Example Embodiment

Figure 14:
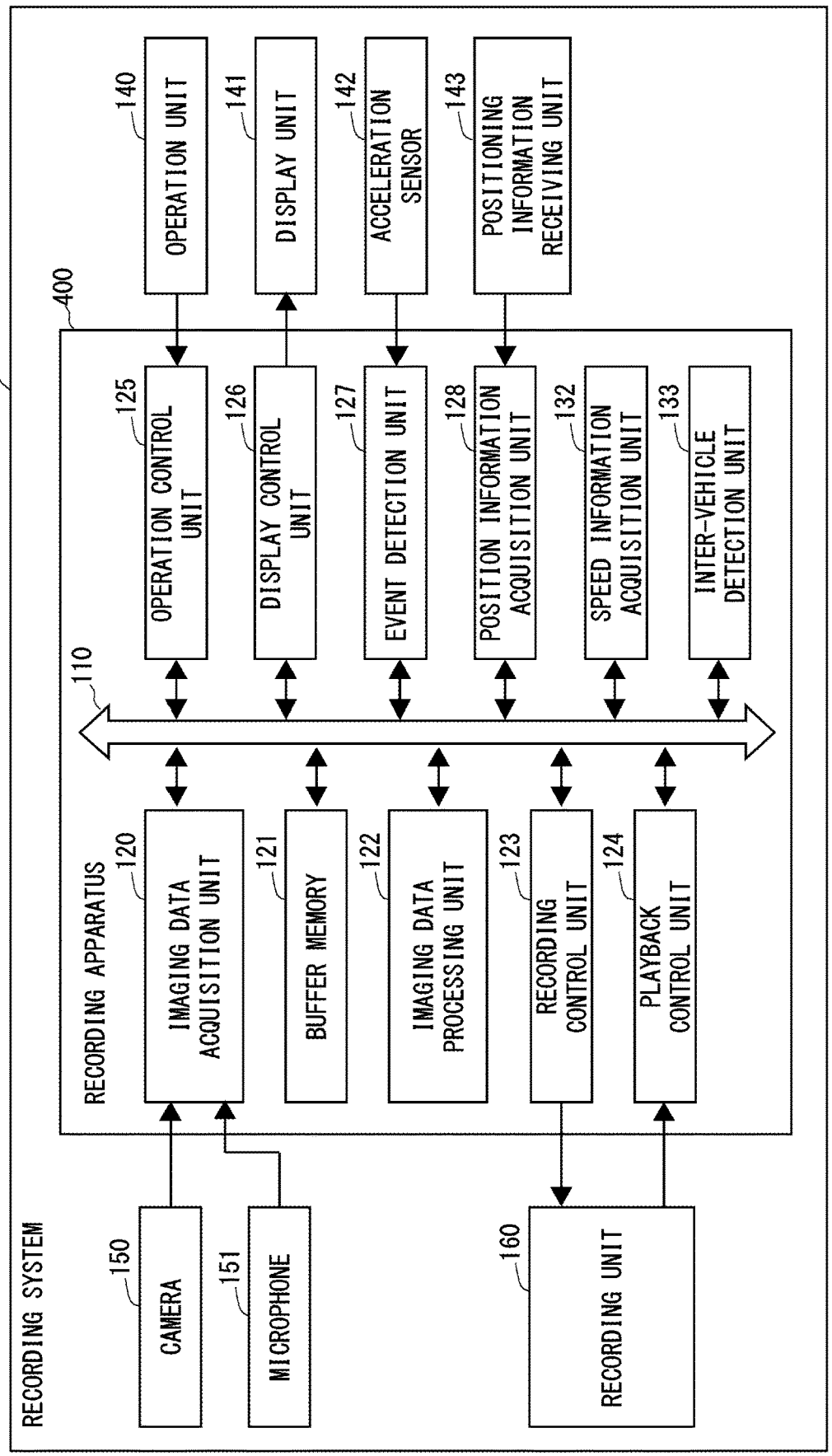
FIG. 14 is a block diagram of a recording system according to a seventh example embodiment.

A seventh example embodiment will be described below. FIG. 14 is a block diagram of a recording system according to the seventh example embodiment. As shown in the drawing, a recording system 40 includes a recording apparatus 400 that controls each component and a plurality of components connected to the recording apparatus 400. The recording apparatus 400 is a control apparatus including a circuit board on which a CPU (Central Processing Unit), a GPU (Graphics Processing Unit), a memory, and a plurality of interfaces or the like are mounted, and executes stored programs, thereby executing various kinds of processing.

Details of the recording apparatus 400 will be described below. The recording apparatus 400 includes, as main components, an imaging data acquisition unit 120, a buffer memory 121, an imaging data processing unit 122, a recording control unit 123, a playback control unit 124, an operation control unit 125, a display control unit 126, an event detection unit 127, a position information acquisition unit 128, a speed information acquisition unit 132, and an inter-vehicle detection unit 133. The processing performed by the recording apparatus 400 is realized by programs executed by the recording apparatus 400. For convenience, each of the components is represented as being connected to a bus line 110.

The recording control unit 123 determines whether a voice recording condition is established when causing the recording unit 160 to record the imaging data related to the loop recording. The "voice recording condition" is a condition for including the first imaging data in the imaging file. The recording control unit 123 records the imaging file including the first imaging data when the voice recording condition is established. The voice recording condition is set to include, for example, a case where the other vehicle around the vehicle 900 approaches abnormally while the vehicle 900 is moving at a normal cruising speed (for example, about 30 km/h or 60 km/h).

For example, the recording control unit 123 determines that the voice recording condition is established when the moving speed of the vehicle 900 is equal to or higher than a preset speed and the distance from the other vehicle is shorter than a preset distance. During such a determination, the recording control unit 123 receives information (speed information) regarding the moving speed of the vehicle from the speed information acquisition unit 132. Further, during such a determination, the recording control unit 123 receives information regarding an inter-vehicle distance between the vehicle and the other vehicle existing around the vehicle, from the inter-vehicle detection unit 133. Then, the recording control unit 123 determines based on the received speed information and the received information regarding the inter-vehicle distance whether the voice recording condition is established.

The recording control unit 123 instructs the imaging data processing unit 122 to generate an imaging file including the first imaging data or the second imaging data in response to such a determination. Further, when the recording control unit 123 causes the recording unit 160 to record the imaging data, based on such a determination, the recording control unit 123 causes the recording unit to record the imaging file including the first imaging data when the voice recording condition is established, and causes the recording unit to record the imaging file including the second imaging data when the voice recording condition is not established.

In the following description, in the case of recording the imaging file including the first imaging data in the recording unit 160, it may be expressed as "recording the first imaging data in the recording unit 160" or "recording the first imaging data". Similarly, in the case of recording the imaging file including the second imaging data in the recording unit 160, it may be expressed as "recording the second imaging data in the recording unit 160" or "recording the second imaging data".

The speed information acquisition unit 132 acquires the speed information of the vehicle 900. The speed information includes information regarding the moving speed of the vehicle 900. The speed information may indicate whether the value of the moving speed is higher or lower than the preset threshold value. The speed information acquisition unit 132 acquires the moving speed from the information received by the recording apparatus 400 from the positioning information receiving unit 143. The speed information acquisition unit 132 supplies the acquired speed information to the recording control unit 123.

The speed information acquisition unit 132 may be communicably connected to an ECU (Electronic Control Unit) or the like in the vehicle 900 via a communication bus such as CAN (Controller Area Network) to acquire and use various information of the vehicle 900. For example, the speed information acquisition unit 132 may acquire the speed information of the vehicle 900.

The inter-vehicle detection unit 133 detects the inter-vehicle distance, which is the distance from the other vehicle existing around the vehicle 900. The inter-vehicle detection unit 133 analyzes the video data received by the imaging data acquisition unit 120 to recognize the vehicle existing around the vehicle 900 and to detect the distance to the other vehicle from the size of the image of the recognized other vehicle. The inter-vehicle detection unit 133 supplies the detected information regarding the inter-vehicle distance to the recording control unit 123. The information regarding the inter-vehicle distance may include the distance detected by the inter-vehicle detection unit 133, or may include information indicating whether the distance is closer than the preset threshold value. Further, when the recording system 10 includes a ranging sensor, the inter-vehicle detection unit 133 may receive information (ranging information) regarding the distance to an object around the vehicle 900 from the ranging sensor, and may detect the inter-vehicle distance by using the received information. Further, the inter-vehicle detection unit 133 may be communicably connected to the ECU of the vehicle 900, and may acquire the ranging information from the ranging sensor of the vehicle 900.

Figure 15:
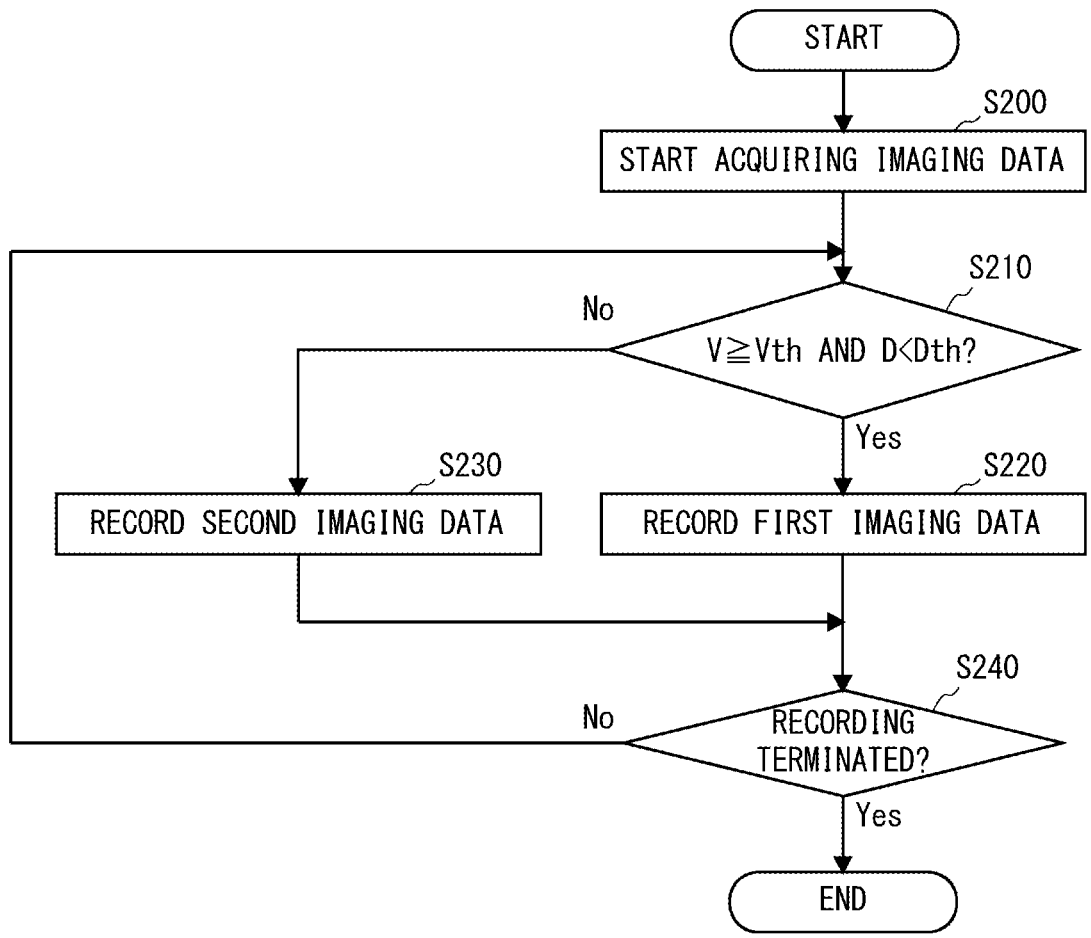
FIG. 15 is a flowchart showing an example of processing executed by a recording apparatus according to the seventh example embodiment.

Next, the processing executed by the recording system 40 will be described with reference to FIG. 15. FIG. 15 is a flowchart showing an example of the processing executed by the recording apparatus according to the seventh example embodiment. The flowchart shown in FIG. 15 shows the processing performed by the recording apparatus 400 of the recording system 40. The flowchart shown in FIG. 15 starts when the recording system 40 is activated, for example.

First, the imaging data acquisition unit 120 of the recording apparatus 400 starts acquiring imaging data (step S200).

Next, the recording apparatus 400 acquires speed information and information regarding the inter-vehicle distance. Then, the recording apparatus 400 determines from the acquired information whether the moving speed V of the vehicle 900 is equal to or higher than a preset threshold value Vth and the detected inter-vehicle distance D is less than a preset threshold value Dth (step S210). In other words, the recording apparatus 400 determines whether the voice recording condition is established.

The threshold value Vth of the speed is, for example, about 30 km/h or 60 km/h. The threshold value Vth may be different depending on whether the vehicle is traveling on a general road or a highway. The threshold value Dth of the distance may also be different depending on whether the vehicle is traveling on a general road or a highway. In addition, the threshold value Dth may be changed stepwise according to the moving speed of the vehicle 900. As an example, the threshold value Dth is 2 m when the vehicle is traveling at a speed of 30 km/h or more, and 3 m when the vehicle is traveling at a speed of 60 km/h or more.

When the recording apparatus 400 determines that the moving speed V is equal to or higher than the threshold value Vth and the inter-vehicle distance D is less than the threshold value Dth, that is, the voice recording condition is established (step S210: Yes), the process proceeds to step S220. On the other hand, when the recording apparatus 400 does not determine that the moving speed V is equal to or higher than the threshold value Vth and the inter-vehicle distance D is less than the threshold value Dth, that is, the voice recording condition is established (step S210: No), the process proceeds to step S230. The case where it is not determined that the voice recording condition is established may be a case where the moving speed V is less than the threshold value Vth, or the inter-vehicle distance D is equal to or higher than the threshold value Dth.

In step S220, the recording apparatus 400 records the first imaging data including the video data and the voice data (step S220). More specifically, the recording control unit 123 of the recording apparatus 400 instructs the imaging data processing unit 122 to generate an imaging file including the first imaging data. Then, when the recording control unit 123 receives the imaging file including the first imaging data from the imaging data processing unit 122, the recording control unit 123 causes the recording unit 160 to record the received imaging file.

On the other hand, in step S230, the recording apparatus 400 records the second imaging data including the video data but not the voice data (step S230). More specifically, the recording control unit 123 of the recording apparatus 400 instructs the imaging data processing unit 122 to generate an imaging file including the second imaging data. Then, when the recording control unit 123 receives the imaging file including the second imaging data from the imaging data processing unit 122, the recording control unit 123 causes the recording unit 160 to record the received imaging file.

In step S240, the recording apparatus 400 determines whether to end a series of processing (step S240). The case of ending a series of processing is, for example, a case where the generation of the imaging file is stopped by the user's operation, a case where the recording system 40 is terminated as the power supply from the vehicle 900 is stopped, or a case where the imaging data is not supplied from the camera 150. When the recording apparatus 400 does not determine to end the series of processing (step S240: No), the process returns to step S210 and the processing is continued. On the other end, when recording apparatus 400 determines to end the series of processing (step S240: Yes), the processing ends.

As described above, the recording apparatus 400 determines whether to record either the first imaging data or the second imaging data depending on whether the voice recording condition is established. Therefore, the recording system 40 records the voice data in a state where the moving speed of the vehicle 900 is equal to or higher than the threshold value Vth and the other vehicle is approaching less than the threshold value Dth.

Figure 16:
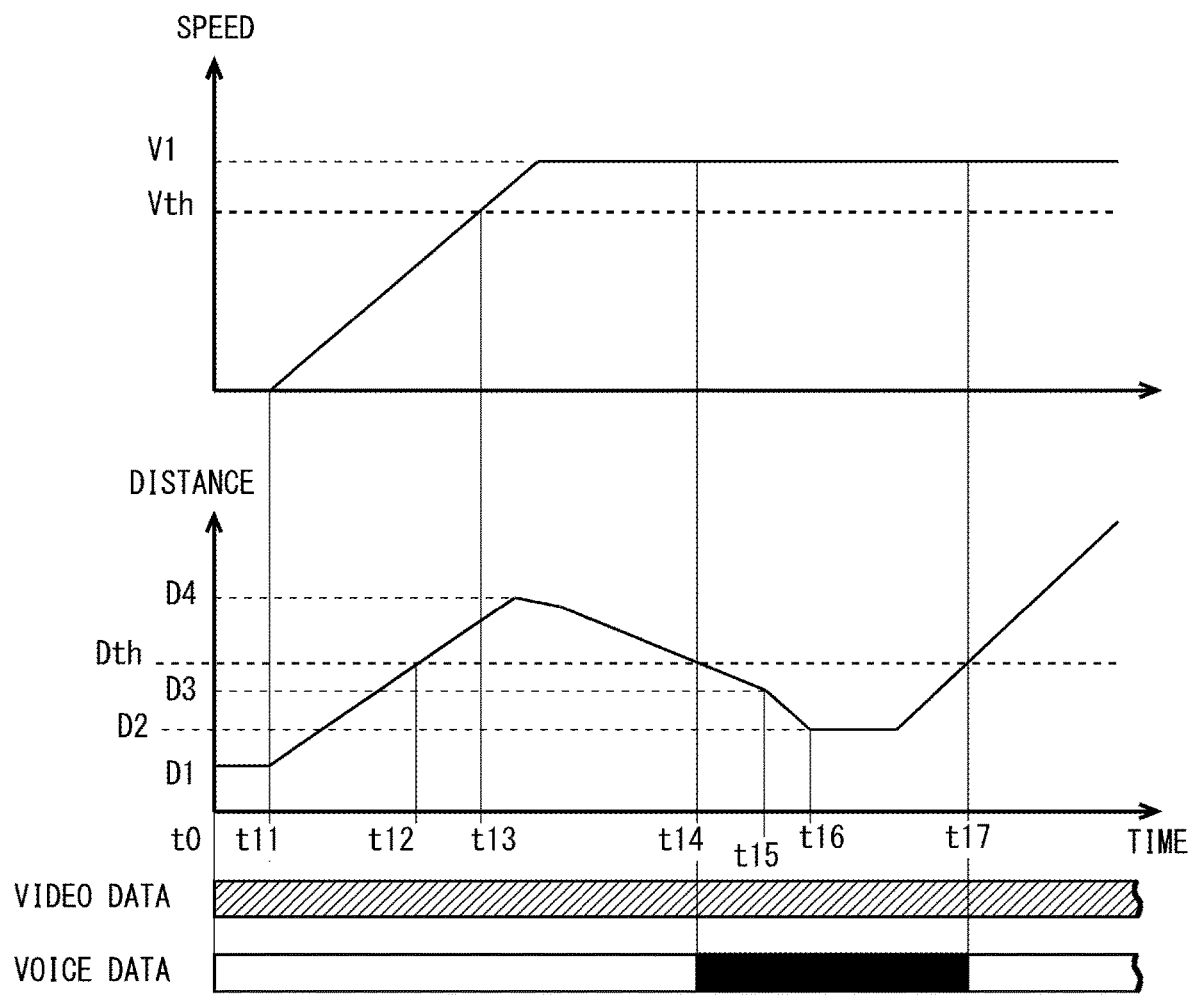
FIG. 16 is a diagram showing a relation between a speed of a vehicle and imaging data in the recording system according to the seventh example embodiment.

Next, a relation between the moving speed of the vehicle 900 and the imaging data will be described with reference to FIG. 16. FIG. 16 is a diagram showing a relation between a speed and imaging data in the recording system according to the seventh example embodiment. An upper stage of FIG. 16 is a graph showing the moving speed of the vehicle 900. In the graph of the upper stage of FIG. 16, a horizontal axis indicates a time, and a vertical axis indicates a speed. A polygonal line drawn in the graph indicates the moving speed of the vehicle 900. According to the graph, the vehicle 900 is in a stop state from a time t0 to a time t11. The vehicle 900 starts moving at the time t11, and accelerates until a speed exceeds a threshold value Vth at a time t13 and reaches a speed V1. The vehicle 900 continues to travel at the speed V1.

In FIG. 16, a graph indicating the inter-vehicle distance from the other vehicle is shown below the graph indicating the moving speed described above. According to the graph, from the time t0 to the time t11, the inter-vehicle distance from the other vehicle is D1. Since the vehicle 900 has started to move from the time t11, the inter-vehicle distance begins to increase, exceeds the threshold value Dth at a time t12, and further increases to a distance D4. Thereafter, the inter-vehicle distance begins to decrease, falls below the threshold value Dth as a time t14, and reaches a distance D3 at a time t15. Further, after a time t15, the distance rapidly decreases, and reaches a distance D2 at a time t16. Thereafter, the distance starts to increase, and exceeds the threshold value Dth at a time t17.

In FIG. 16, a recording status of the video data is indicated by a hatched band-shaped line below the line indicating the inter-vehicle distance described above. As shown in the drawing, the line indicating the recording status of the video data extends from the time t0 in parallel with the horizontal axis indicating the time without being broken. In other words, the video data is normally recorded regardless of the moving speed of the vehicle 900.

In FIG. 16, a recording status of the voice data is indicated by a white or black band-shaped line below the line indicating the recording status of the video data. Here, the black line indicates that the voice data is recorded in the recording unit 160 at the corresponding time. Further, the white line indicates that the voice data is not recorded in the recording unit 160 at the corresponding time.

As shown in FIG. 16, the vehicle 900 is in a state where the speed V is equal to or higher than the threshold value Vth and the inter-vehicle distance D is below the threshold value Dth from the time t14 to the time t17. In other words, the voice recording condition is established during a period from the time t14 to the time t17. Accordingly, as shown in the drawing, the recording status of the voice data is indicated by the black line during the period from the time t14 to the time t17. In other words, the imaging file includes the voice data during this period.

As described above, the recording apparatus 400 causes the recording unit 160 to record the first imaging data including the voice data when the moving speed of the vehicle 900 is equal to or higher than the threshold value Vth and the inter-vehicle distance is less than the threshold value Dth (when the voice recording condition is established). On the other hand, the recording system 40 causes the recording unit 160 to record the second imaging data not including the voice data when the moving speed of the vehicle 900 is less than the threshold value Vth or the inter-vehicle distance is equal to or more than the threshold value Dth (when the voice recording condition is not established). With such a configuration, the recording apparatus 400 can record the voice data, for example, when there is the other vehicle abnormally approaching the vehicle 900 which is traveling.

The seventh example embodiment has been described above. The recording apparatus 400 according to the seventh example embodiment is not limited to the above-described configuration. The recording apparatus 400 according to the seventh example embodiment may be, for example, a configuration including the camera 150, the microphone 151, and recording unit 160. Further, the recording apparatus 400 may be a configuration similar to that of the recording system 40. The recording apparatus 400 does not have to be housed in one console. The recording apparatus 400 may be in a state of being connected via wired or wireless communication. The camera 150 may be the omnidirectional camera as described above, or may be a plurality of cameras that capture an image of at least the outside of the vehicle 900.

As described above, according to the seventh example embodiment, it is possible to provide the recording system or the like that suitably records the voice data.

Eighth Example Embodiment

An eighth example embodiment will be described below. A hardware configuration of a recording system according to the eighth example embodiment is the same as that of the first example embodiment. The eighth example embodiment differs from the seventh example embodiment in terms of a condition for determining that the first imaging data is recorded. Specifically, when the recording control unit 123 determines whether the voice recording condition is established, the recording control unit 123 determines that the voice recording condition is established when the other vehicle approaches at a speed equal to or higher than a preset relative speed.

Figure 17:
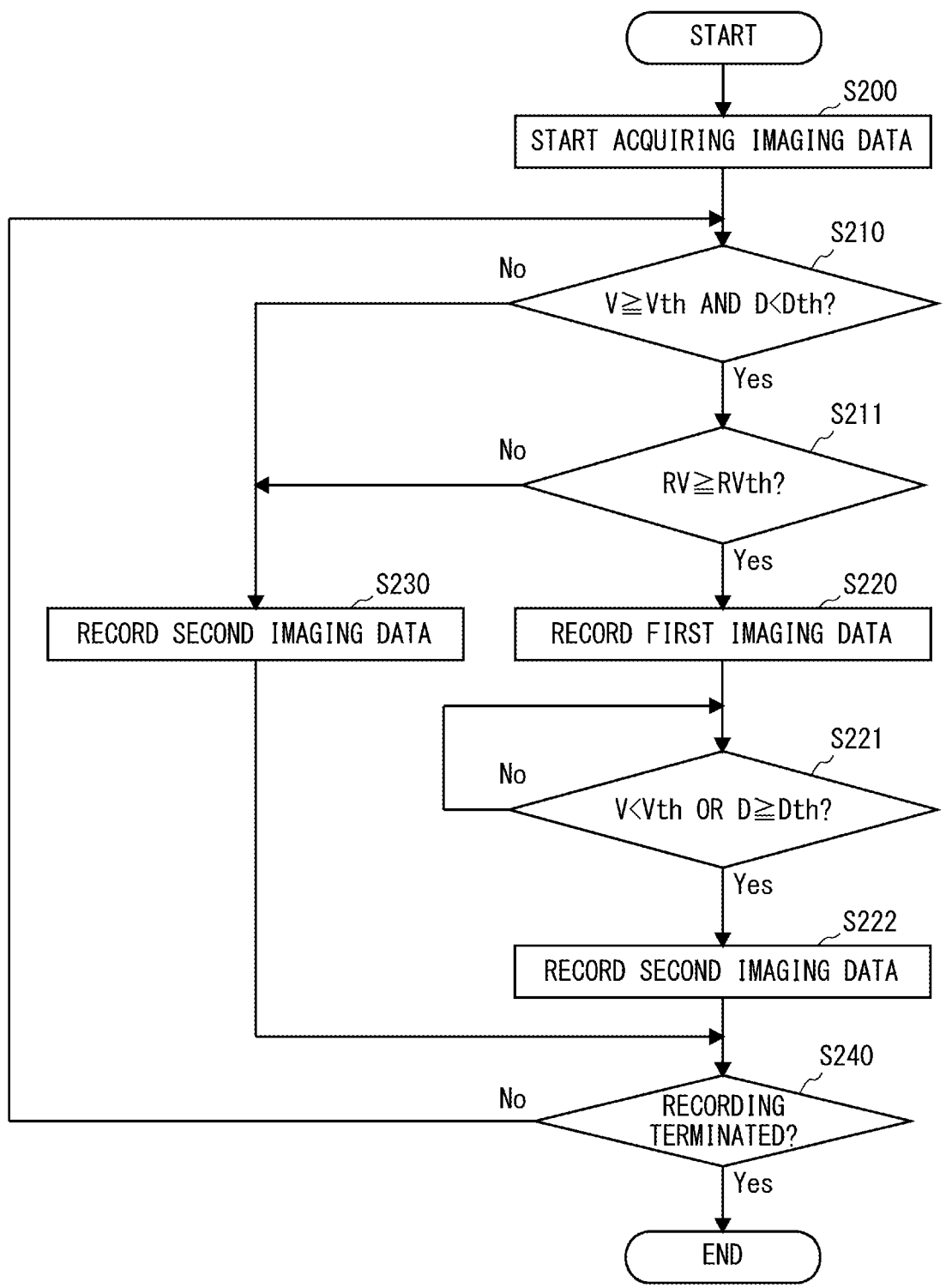
FIG. 17 is a flowchart showing an example of processing executed by a recording apparatus according to an eighth example embodiment.

FIG. 17 is a flowchart showing an example of processing executed by the recording system according to the eighth example embodiment. The flowchart shown in FIG. 17 shows the processing performed by the recording apparatus 400 of the recording system 40. The flowchart shown in FIG. 17 is different from the flowchart shown in FIG. 15 in that step S210 is followed by step S211 and step S220 is followed by steps S221 and S222. In the following description, the same processing as the above-described flowchart may be omitted as appropriate.

First, the imaging data acquisition unit 120 of the recording apparatus 400 starts acquiring imaging data (step S200).

Next, the recording apparatus 400 acquires speed information and information regarding the inter-vehicle distance. Then, the recording apparatus 400 determines from the acquired information whether the moving speed V of the vehicle 900 is equal to or higher than a preset threshold value Vth and the detected inter-vehicle distance D is less than a preset threshold value Dth (step S210). In other words, the recording apparatus 400 determines whether the voice recording condition is established.

When the recording apparatus 400 determines that the moving speed V is equal to or higher than the threshold value Vth and the inter-vehicle distance D is less than the threshold value Dth, that is, the voice recording condition is established (step S210: Yes), the process proceeds to step S211. On the other hand, when the recording apparatus 400 does not determine that the moving speed V is equal to or higher than the threshold value Vth and the inter-vehicle distance D is less than the threshold value Dth, that is, the voice recording condition is established (step S210: No), the process proceeds to step S230.

In step S211, the recording apparatus 400 calculates a relative speed RV at the time of approaching of the other vehicle approaching the vehicle 900 until the state where step S210 becomes Yes or a relative speed RV at the time of approaching of the other vehicle approaching the vehicle 900 after the state where step S210 becomes Yes. For example, the recording control unit 123 calculates a change in the inter-vehicle distance, that is, the relative speed from the information regarding the inter-vehicle distance periodically received from the inter-vehicle detection unit 133. Then, the recording control unit 123 determines whether the calculated relative speed RV is equal to or higher than a preset threshold value RVth (step S211). When the recording apparatus 400 determines that the relative speed RV is equal to or higher than the preset threshold value RVth (step S211: Yes), the process proceeds to step S220. On the other hand, when the recording apparatus 400 does not determine that relative speed RV is equal to or higher than the preset threshold value RVth (step S211: No), the process proceeds to step S230. In the description of the example embodiment, the relative speed RV is assumed to be a positive value when the other vehicle approaches the vehicle 900.

In step S220, the recording apparatus 400 records the first imaging data (step S220), and the process proceeds to step S221.

Subsequently, the recording apparatus 400 determines whether the moving speed V is less than the threshold value Vth or the inter-vehicle distance D is equal to or more than the threshold value Dth (step S221). In other words, the recording apparatus 400 determines whether the voice recording condition is not established. When the recording apparatus 400 does not determine that the moving speed V is less than the threshold value Vth or the inter-vehicle distance D is equal to or more than the threshold value Dth (step S221: No), the process repeats step S221. On the other hand, when the recording apparatus 400 determines that the moving speed V is less than the threshold value Vth or the inter-vehicle distance D is equal to or more than the threshold value Dth (step S221: Yes), the recording apparatus 400 ends the recording of the first imaging data, and records the second imaging data (step S222). Then, the recording apparatus 400 performs a process of step S240.

The processes of steps S230 S240 are the same as the processes described with reference to FIG. 15, and thus will not be described here.

As described above, when the recording apparatus 400 determines whether the voice recording condition is established, the recording apparatus 400 determines that the voice recording condition is established when the other vehicle approaches at a speed equal to or higher than the preset relative speed.

Figure 18:
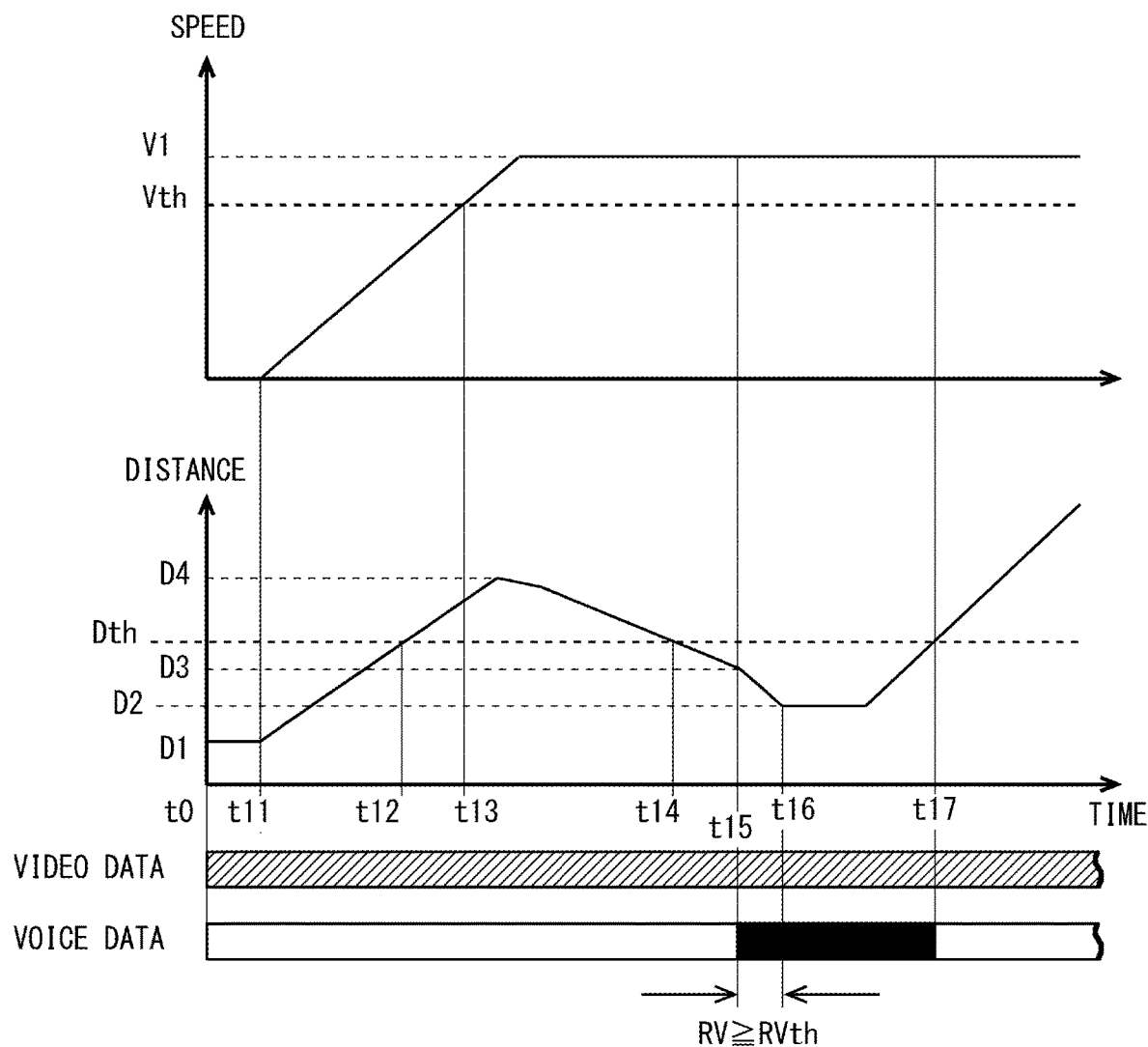
FIG. 18 is a diagram showing a relation between a speed of a vehicle and imaging data in the recording apparatus according to the eighth example embodiment.

Next, a relation between the moving speed of the vehicle 900 and the imaging data will be described with reference to FIG. 18. FIG. 18 is a diagram showing a relation between a speed and imaging data in the recording system according to the eighth example embodiment. As in FIG. 16, an upper stage of FIG. 18 is a graph showing the moving speed of the vehicle 900, and a graph indicating the inter-vehicle distance, a line indicating a recording status of the video data, and a line indicating a recording status of the voice data are shown below the graph indicating the moving speed. In FIG. 18, the recording status of the voice data is different from that in FIG. 16.

As shown in FIG. 18, during a period from a time t14 to a time t17, the speed V is equal to or higher than the threshold value Vth, and the inter-vehicle distance D is below the threshold value Dth. Further, during a period from a time t15 to a time t16, the inter-vehicle distance D changes from a distance D3 to a distance D2. During this period, the relative speed RV of the other vehicle is equal to or higher than the threshold value RVth. In other words, the voice recording condition is established during the period from the time t15 to the time t17. Therefore, as shown in the drawing, the recording status of the voice data is indicated by a black line during the period from the time t15 to the time t17. That is, the imaging file includes the voice data during this period.

With the above-described configuration, the recording apparatus 400 can record the voice data when there is the other vehicle rapidly approaching the traveling vehicle 900 within a predetermined range, for example. In other words, according to the eighth example embodiment, it is possible to provide the recording system or the like that suitably records the voice data when there is a possibility of being affected by the road rage.

Ninth Example Embodiment

A ninth example embodiment will be described below. A hardware configuration of a recording system according to the ninth example embodiment is the same as that of the seventh example embodiment. The ninth example embodiment differs from the seventh example embodiment in terms of a process after the recording of the first imaging data is started. Specifically, the recording control unit 123 causes the recording unit 160 to record the first imaging data for a preset period from the time when the voice recording condition is not established after the voice recording condition is established.

Figure 19:
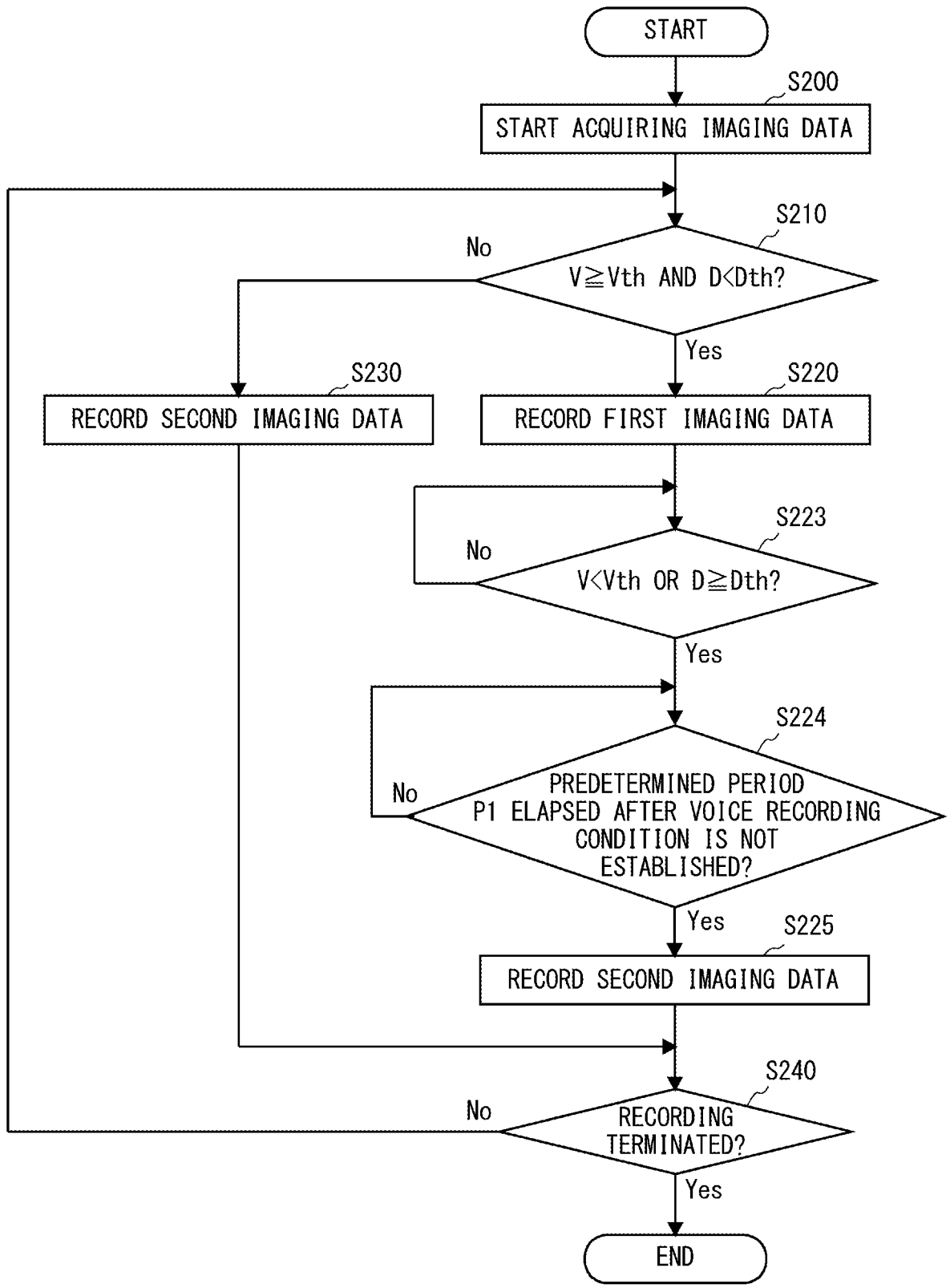
FIG. 19 is a flowchart showing an example of processing executed by a recording apparatus according to a ninth example embodiment.

FIG. 19 is a flowchart showing an example of processing executed by the recording system according to the ninth example embodiment. The flowchart shown in FIG. 19 shows the processing performed by the recording apparatus 100 of the recording system 10. The flowchart shown in FIG. 19 is different from the flowchart shown in FIG. 15 in that step S220 is followed by steps S223 to S225. Hereinafter, Focusing on the differences from the flowchart shown in FIG. 15, FIG. 19 will be described.

In step S220, the recording apparatus 1400 records the first imaging data (step S220), and the process proceeds to step S223.

Subsequently, the recording apparatus 400 determines whether the moving speed V is less than the threshold value Vth or the inter-vehicle distance D is equal to or more than the threshold value Dth (step S223). In other words, the recording apparatus 400 determines whether the voice recording condition is not established. When the recording apparatus 400 does not determine that the moving speed V is less than the threshold value Vth or the inter-vehicle distance D is equal to or more than the threshold value Dth (step S223: No), the process repeats step S223. On the other hand, when the recording apparatus 400 determines that the moving speed V is less than the threshold value Vth or the inter-vehicle distance D is equal to or more than the threshold value Dth (step S223: Yes), the recording apparatus 400 performs a process of step S224.

In step S224, the recording apparatus 400 determines whether the preset period P1 has elapsed from the time when the voice recording condition is not established (step S224). More specifically, for example, the recording apparatus 400 stores the time when the voice recording condition is not established, counts up the counter from the stored time, and determines that the predetermined period P1 has elapsed when counting a preset number. The predetermined period P1 is a preset period, for example, 3 minutes. When the recording apparatus 400 does not determined that the predetermined period P1 has elapsed after the voice recording condition is not established (step S224: No), the recording apparatus 400 repeats step S224. When the recording apparatus 400 determines that the predetermined period P1 has elapsed after the voice recording condition is not established (step S224: Yes), the recording apparatus 400 ends the recording of the first imaging data and starts the recording of the second imaging data (step S225). Then, the recording apparatus 400 performs step S240. The process of step S240 has already been described in the flowchart shown in FIG. 15, and thus will not be described here.

Figure 20:
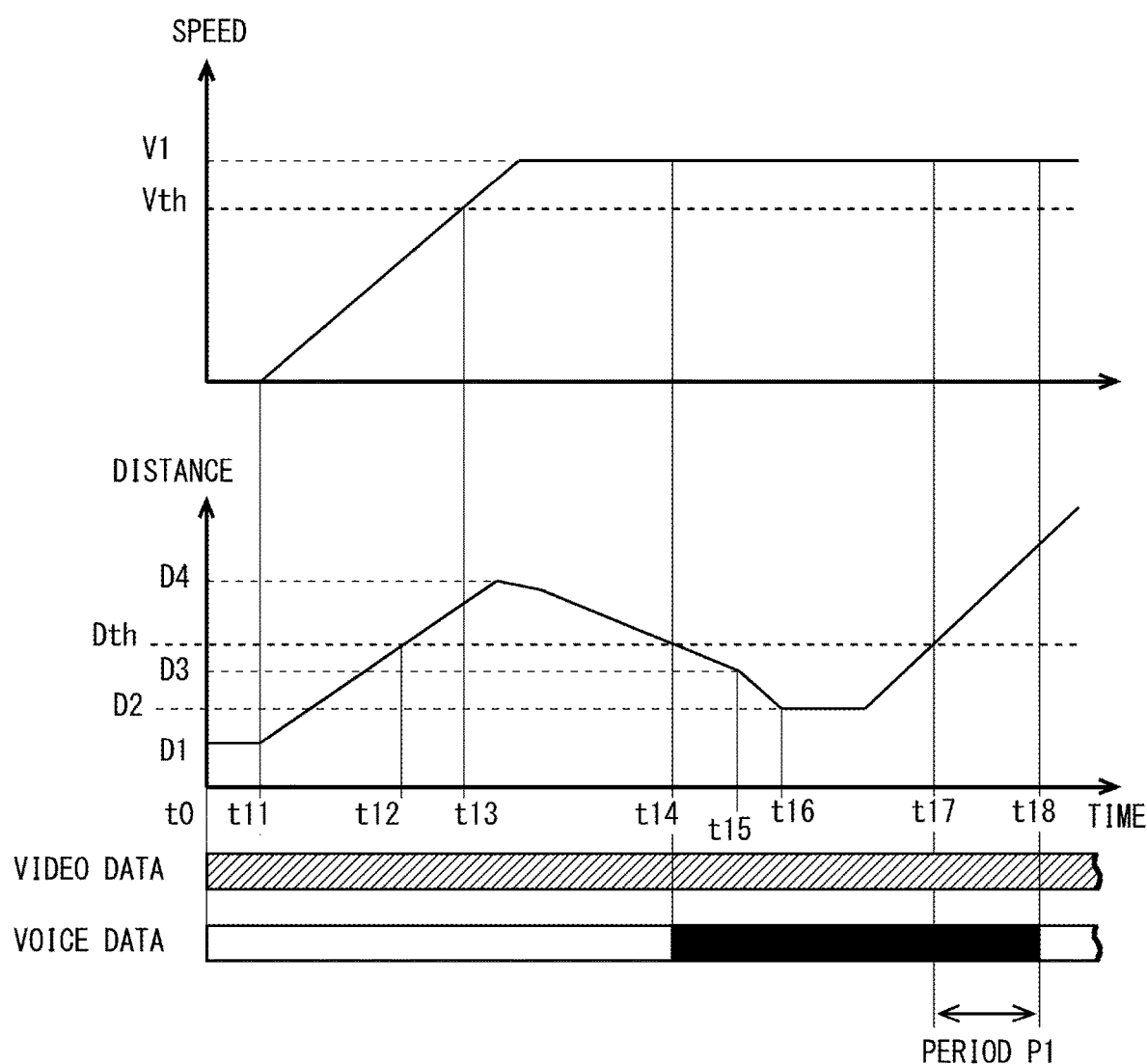
FIG. 20 is a diagram showing a relation between a speed of a vehicle and imaging data in the recording apparatus according to the ninth example embodiment.

Next, a relation between the moving speed of the vehicle 900 and the imaging data will be described with reference to FIG. 20. FIG. 20 is a diagram showing a relation between a speed and imaging data in the recording system according to the ninth example embodiment. As in FIG. 16, an upper stage of FIG. 20 is a graph showing the moving speed of the vehicle 900, and a graph indicating the inter-vehicle distance, a line indicating a recording status of the video data, and a line indicating a recording status of the voice data are shown below the graph indicating the moving speed. In FIG. 20, the recording status of the voice data is different from that in FIG. 16.

As shown in FIG. 20, during from a time t14 to a time t17, the speed V is equal to or higher than the threshold value Vth, and the inter-vehicle distance D is below the threshold value Dth. Further, at the time t17, the inter-vehicle distance D exceeds a distance Dth and changes from the state where the voice recording condition is established to a state where the voice recording condition is not established. A time t18 after the time t17 is a time when the predetermined period P1 has elapsed from the time t17. As shown in the drawing, the line indicating the recording status of the voice data is indicated in black from the time t14 to a time 18. In other words, the recording apparatus 400 starts recording the imaging file including the first imaging data at the time t14 when the voice recording condition is established, and ends the recording of the imaging file including the first imaging data at the time t18 when the period P1 has elapsed from the time t17 when the voice recording condition is not established.

With the above-described configuration, the recording apparatus 400 can start recording the voice data with the approach of the other vehicle when there is the other vehicle abnormally approaching the traveling vehicle 900, for example, and can continue to record the voice data for a predetermined period even after the other vehicle becomes distant. In other words, according to the ninth example embodiment, it is possible to provide the recording system or the like that suitably records the voice data for a case that may be affected by road rage and an event that may occur thereafter.

The configuration according to the present example embodiment is not limited to the above-described contents. For example, the configuration of the present example embodiment can be executed in combination with the processing described in the eighth example embodiment.

Tenth Example Embodiment

A tenth example embodiment will be described below. A hardware configuration of a recording system according to the tenth example embodiment is the same as that of the seventh example embodiment. However, the recording system according to the present example embodiment differs from the seventh example embodiment in terms of a process in a case where an event is detected.

Figure 21:
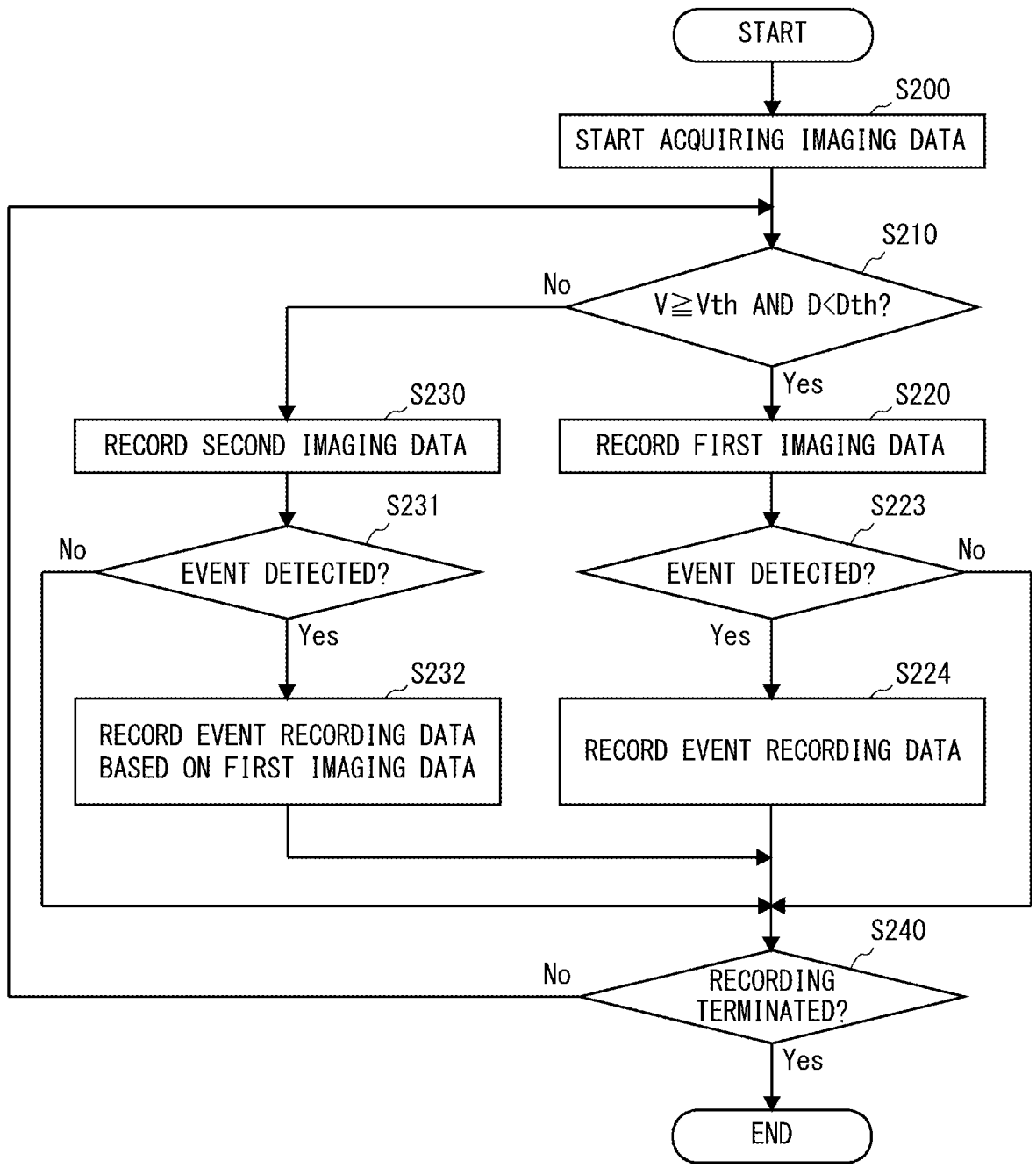
FIG. 21 is a flowchart showing an example of processing executed by a recording apparatus according to a tenth example embodiment.

FIG. 21 is a flowchart showing an example of processing executed by the recording system according to the tenth example embodiment. The flowchart shown in FIG. 21 is different from the flowchart shown in FIG. 15 in that an event detecting process is provided between step S220 and step S240 and between step S230 and step S240.

The recording apparatus 400 constantly determines based on the signal received from the acceleration sensor 142 whether an event occurs during a period in which the recording system 40 is operating. When an event is detected during a period in which the first imaging data is being recorded, the recording apparatus 400 records the first imaging data as event recording data in the recording unit 160. When an event is detected during a period in which the second imaging data is being recorded, the imaging data subjected to loop recording is the second imaging data, but the recording apparatus 400 records the first imaging data, as event recording data, in the recording unit 160.

In FIG. 21, the recording apparatus 400 determines whether the event detection unit 127 detects an event after the process of step S220 (step S223). When the recording apparatus 400 determines that the event detection unit 127 detects the event (step S223: Yes), the process proceeds to step S224. On the other hand, when the recording apparatus 400 does not determine that the event detection unit 127 detects the event (step S223: No), the process proceeds to step S240.

In step S224, the recording apparatus 400 records the first imaging data as event recording data. Specifically, the recording apparatus 400 records the first imaging data for a predetermined period before and after the detection of the event detected in step S223, as event recording data for which overwriting is prohibited, in the recording unit 160 (step S224). The predetermined period before and after the detection of the event is, for example, 30 seconds before and after. After the recording apparatus 400 records the event recording data, the process proceeds to step S240.

After the process of step S230, the recording apparatus 400 determines whether the event detection unit 127 detects an event (step S231). When the recording apparatus 400 determines that the event detection unit 127 detects the event (step S231: Yes), the process proceeds to step S232. On the other hand, when the recording apparatus 400 does not determine that the event detection unit 127 detects the event (step S231: No), the process proceeds to step S240.

In step S232, the recording apparatus 400 records the first imaging data as event recording data. Specifically, the imaging data subjected to loop recording is the second imaging data, but the recording apparatus 400 records the first imaging data for a predetermined period before and after the detection of the event detected in step S231, as event recording data for which overwriting is prohibited, in the recording unit 160 (step S232). After the recording apparatus 400 records the event recording data, the process proceeds to step S240.

As described above, the recording apparatus 400 according to the tenth example embodiment determines, based on the inter-vehicle distance to the other vehicle when traveling at a speed equal to or higher than the preset speed, whether to record the first imaging data or the second imaging data. The recording apparatus 400 according to the tenth example embodiment further records the first imaging data as event recording data regardless of the inter-vehicle distance when the event is detected.

With such a configuration, the recording apparatus 400 according to the tenth example embodiment records an imaging file including voice data when the inter-vehicle distance between the vehicle traveling at a speed equal to or higher than the preset speed and the other vehicle is narrowed, and records the imaging file including the voice data regardless of the inter-vehicle distance when the event is detected. As described above, according to the tenth example embodiment, it is possible to provide the recording system or the like that suitably records the voice data regardless of whether the event has occurred.

In the present example embodiment, as step S210, the process of recording the first imaging data is adopted when the moving speed V is equal to or higher than the threshold value Vth and the inter-vehicle distance D is less than the threshold value Dth, that is, the voice recording condition is established. However, in addition to the above-described process, as described in eighth example embodiment, the process of determining whether the relative speed RV is equal to or higher than the preset threshold value RVth may be adopted. In addition to the above-described process, as described in the ninth example embodiment, the process of determining whether the preset period P1 has elapsed from the time when the voice recording condition is not estab- lished may be adopted. Further, the flowchart shown in FIG. 21 is an example, and the tenth example embodiment may be made up of other steps.

Eleventh Example Embodiment

Figure 22:
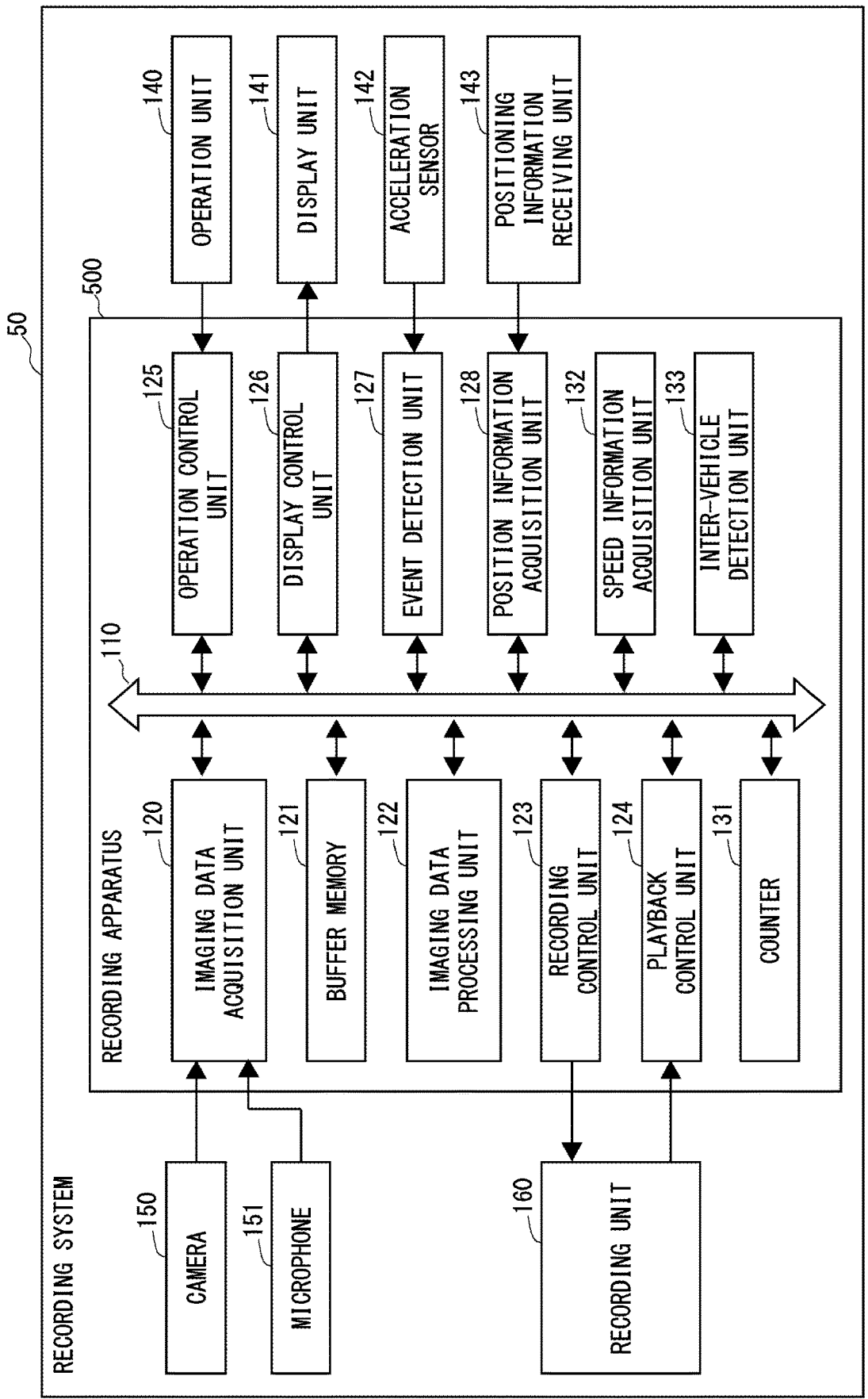
FIG. 22 is a block diagram showing a recording system according to an eleventh example embodiment.

An eleventh example embodiment will be described below. The recording apparatus according to the eleventh example embodiment is different from that of the seventh example embodiment in that the recording apparatus includes a counter. FIG. 22 is a block diagram showing the recording system according to the eleventh example embodiment. A recording system 50 shown in FIG. 22 includes a recording apparatus 500 instead of the recording apparatus 400 according to the seventh example embodiment. The recording apparatus 500 is different from the recording apparatus 400 according to the seventh example embodiment in that a counter 131 is provided.

After the first imaging data is recorded, the counter 131 counts the preset number of counts by using the recording of the first imaging data as a trigger. The counter 131 supplies a signal indicating that the preset number of counts has been reached to the recording control unit 123. The preset number of counts may be the number of counts that is incremented in response to a clock signal transmitted by a semiconductor or a crystal.

As described above, the recording control unit 123 causes the recording unit 160 to record the imaging file by loop recording. Therefore, the recording control unit 123 overwrites the new imaging file sequentially from the area where the old imaging file is recorded. However, the recording control unit 123 in the present example embodiment does not erase the imaging file including the first imaging data until the preset number of counts is exceeded. In other words, after recording the first imaging data, the recording control unit 123 overwrites or erases the recorded first imaging data after exceeding the preset number of counts.

Figure 23:
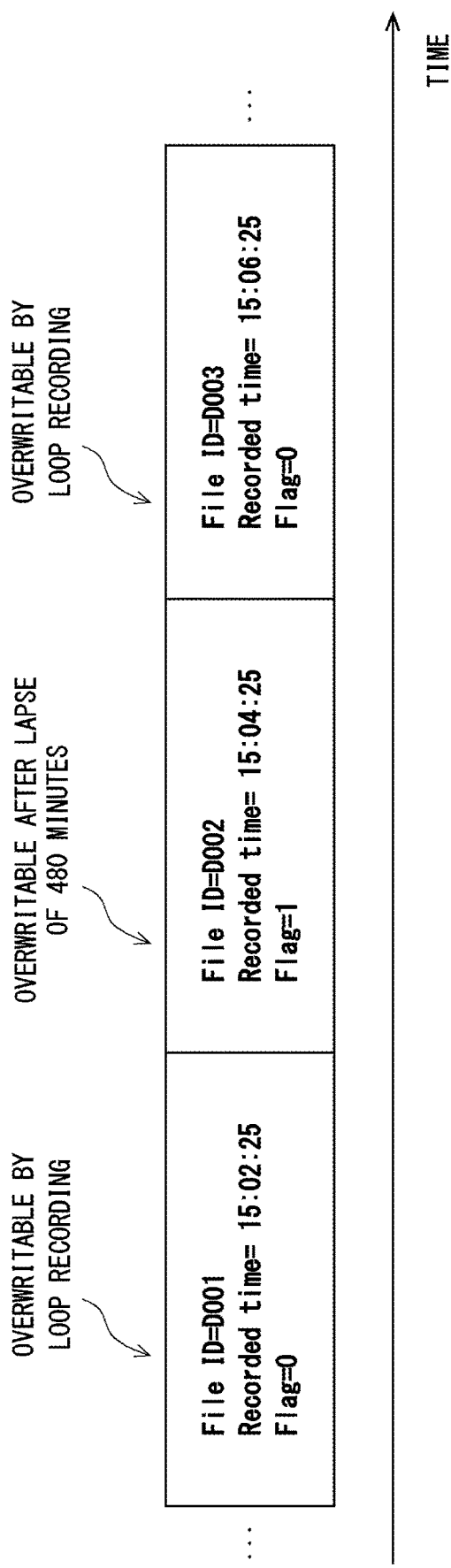
FIG. 23 is a diagram showing an example of an imaging file generated by a recording apparatus according to the eleventh example embodiment.

FIG. 23 is a diagram showing an example of an imaging file generated by the recording apparatus according to the eleventh example embodiment. In FIG. 23, an arrow extending from left to right indicates a time. A rectangle shown above the arrow indicates an imaging file recorded by the recording unit 160 under the control of the recording control unit 123. The imaging file constitutes an independent file for each preset period. FIG. 23 shows three consecutive imaging files as an example of imaging files. Each of the imaging files shown in FIG. 23 includes imaging data for 2 minutes. Each of the imaging files includes various information as header information. For example, the imaging file includes a flag including an identifier, recorded time, and voice data.

For example, the imaging file on the left side has a file identifier (File ID) of D001. The imaging file D001 includes time information of 15:02:25 as a recorded time. Further, a flag indicating that the imaging file includes the voice data is indicated by 0. When the flag is 1, the imaging file includes the voice data. When the flag is 0, the imaging file does not include the voice data. Therefore, the imaging file D001 does not include the voice data.

Similarly, the central imaging file has a file identifier of D002. The imaging file D002 includes time information of 15:04:25 as a recorded time. Further, a flag indicating that the imaging file includes the voice data is indicated by 1. When the flag is 1, the imaging file includes the voice data. That is, the imaging file D002 includes the voice data.

Further, the imaging file on the right side has a file identifier (File ID) of D003. The imaging file D003 includes time information of 15:06:25 as a recorded time. Further, a flag indicating that the imagining file includes the voice data is indicated by 0. That is, the imaging file D003 does not include the voice data.

The imaging files recorded in the recording unit 160 are sequentially erased in order from the oldest by the recording control unit 123 that performs loop recording. For example, the recording unit 160 is set to be capable of storing 15 imaging files as loop recording. In this case, the recording unit 160 records 15 imaging files for 2 minutes, that is, the imaging data for 30 minutes. Therefore, the imaging file not including the voice data is erased by being overwritten with another new imaging file after 30 minutes have elapsed. On the other hand, the imaging file including the voice data is not overwritten until 480 minutes (8 hours) as a preset period have elapsed from the recorded time included in the header. In other words, the imaging file having the flag of 1 can be overwritten after the counter counts the lapse of 480 minutes after being recorded. The counting period is an example, and 480 minutes may be any period. Any period may be set to infinity. That is, when the flag is 1, overwriting prohibition may be set. In other words, the priority of overwriting the first imaging data is set lower than that of the second imaging data.

With such a configuration, the recording apparatus according to the present example embodiment prevents the imaging file, in which some events may be recorded, from being erased. Therefore, according to the present example embodiment, it is possible to provide the recording system or the like that suitably records the voice data and prevents the recorded imaging data from being erased when the vehicle is subjected to the road rage during the traveling, for example. The configuration according to the present example embodiment can be combined with the various example embodiments described above.

The above-described programs may be stored and supplied to a computer by using various types of non-transitory computer readable media. The non-transitory computer readable media include various types of tangible storage media. Examples of the non-transitory computer readable media include a magnetic recording medium (for example, a flexible disk, a magnetic tape, and a hard disk drive), a magneto-optic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (Random Access Memory)). These programs may be supplied to computers by using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

Although the present invention is described above with reference to the example embodiments, the present invention is not limited to the above-described example embodiments. Various modifications that can be understood by those skilled in the art can be made to the configuration and details of the present invention within the scope of the present invention.

What is claimed is:

1. A recording apparatus comprising:
    a processor coupled to a memory storing instructions to permit the processor to function as:
        an imaging data acquisition unit configured to acquire imaging data including a video data that is data of an image captured with a camera mounted on a vehicle and a voice data that is data of voice collected by a microphone mounted on the vehicle;
        a movement information acquisition unit configured to acquire movement information including at least one of a moving speed and a moving acceleration of the vehicle;
        a road rage detection unit configured to detect road rage performed on the vehicle by a vehicle adjacent to the vehicle; and
        a recording controller configured to, when the imaging data is recorded by loop recording in a recording unit without being caused by occurrence of an event, determine based on the movement information and status of the road rage detection whether to cause the recording unit to record first imaging data including the video data and the voice data or whether to cause the recording unit to record second imaging data including the video data but not the voice data, and to cause the recording unit to permit overwriting of the data in the recording unit with the first imaging data or the second imaging data,
    wherein the recording controller determines that the recording unit records the first imaging data in the recording unit by loop recording when the moving speed or the moving acceleration of the vehicle changes from a value higher than a preset threshold value to a value lower than the threshold value after the road rage detection unit detects the road rage based on the imaging data that captured with the camera mounted on the vehicle,
    wherein the recording apparatus further comprises an event detection unit configured to detect that an event has occurred for the vehicle, and
    wherein when the event detection unit detects occurrence of the event during a period in which the first imaging data is being loop-recorded, the recording controller determines to cause the recording unit to record the first imaging data in the recording unit as event recording data while prohibiting overwriting or erasing of the first imaging data, and when the event detection unit detects occurrence of the event during a period in which the second imaging data is being loop-recorded, the recording controller determines to cause the recording unit to record the first imaging data in the recording unit as event recording data while prohibiting overwriting or erasing of the first imaging data.

2. The recording apparatus according to claim 1, further comprising a counter configured to start counting after the recording unit records the first imaging data and count a preset number of counts,
    wherein the recording controller does not erase the first imaging data until the number of counts is exceeded.

3. A recording method comprising:
    an imaging data acquisition step of acquiring imaging data including a video data that is data of an image captured with a camera mounted on a vehicle and a voice data that is data of voice collected by a microphone mounted on the vehicle;
    a movement information acquisition step of acquiring movement information including at least one of a moving speed and a moving acceleration of the vehicle;
    a road rage detection step of detecting road rage performed on the vehicle by a vehicle adjacent to the vehicle; and
    a recording control step of, when the imaging data is recorded by loop recording in a recording unit without being caused by occurrence of an event, determining based on the movement information and status of the road rage detection whether to cause the recording unit to record first imaging data including the video data and the voice data or whether to cause the recording unit to record second imaging data including the video data but not the voice data, and causing the recording unit to permit overwriting of the data in the recording unit with the first imaging data or the second imaging data, wherein the recording control step includes determining that the recording unit records the first imaging data in the recording unit by loop recording when the moving speed or the moving acceleration of the vehicle changes from a value higher than a preset threshold value to a value lower than the threshold value after detecting the road rage based on the imaging data that captured with the camera mounted on the vehicle in the road rage detection step, wherein the recording method further comprises an event detection step of detecting that an event has occurred for the vehicle, and wherein the recording control step includes, when occurrence of the event is detected during a period in which the first imaging data is being loop-recorded in the event detection step, determining that the recording unit records the first imaging data in the recording unit as event recording data while prohibiting overwriting or erasing of the first imaging data, and when occurrence of the event is detected during a period in which the second imaging data is being loop-recorded, determining that the recording unit records the first imaging data in the recording unit as event recording data while prohibiting overwriting or erasing of the first imaging data.

4. A non-transitory computer readable medium storing a control program for causing a computer to execute a recording method comprising:

an imaging data acquisition step of acquiring imaging data including a video data that is data of an image captured with a camera mounted on a vehicle and a voice data that is data of voice collected by a microphone mounted on the vehicle;

a movement information acquisition step of acquiring movement information including at least one of a moving speed and a moving acceleration of the vehicle;

a road rage detection step of detecting road rage performed on the vehicle by a vehicle adjacent to the vehicle; and a recording control step of, when the imaging data is recorded by loop recording in a recording unit without being caused by occurrence of an event, determining based on the movement information and status of the road rage detection whether to cause the recording unit to record first imaging data including the video data and the voice data or whether to cause the recording unit to record second imaging data including the video data but not the voice data, and causing the recording unit to permit overwriting of the data in the recording unit with the first imaging data or the second imaging data, wherein the recording control step includes determining that the recording unit records the first imaging data in the recording unit by loop recording when the moving speed or the moving acceleration of the vehicle changes from a value higher than a preset threshold value to a value lower than the threshold value after detecting the road rage based on the imaging data that captured with the camera mounted on the vehicle in the road rage detection step, wherein the recording method further comprises an event detection step of detecting that an event has occurred for the vehicle, and wherein the recording control step includes, when occurrence of the event is detected during a period in which the first imaging data is being loop-recorded in the event detection step, determining that the recording unit records the first imaging data in the recording unit as event recording data while prohibiting overwriting or erasing of the first imaging data, and when occurrence of the event is detected during a period in which the second imaging data is being loop-recorded, determining that the recording unit records the first imaging data in the recording unit as event recording data while prohibiting overwriting or erasing of the first imaging data.

* * * * *